US012383102B2

(12) United States Patent
Kolar et al.

(10) Patent No.: US 12,383,102 B2
(45) Date of Patent: *Aug. 12, 2025

(54) INTERLOCKING BLENDING SYSTEM

(71) Applicant: VITA-MIX MANAGEMENT CORPORATION, Olmsted Township, OH (US)

(72) Inventors: David J. Kolar, Stow, OH (US); Saifur Tareen, Copley, OH (US); Eric Miller, Olmsted Township, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 988 days.

This patent is subject to a terminal disclaimer.

(21) Appl. No.: 17/460,357

(22) Filed: Aug. 30, 2021

(65) Prior Publication Data

US 2022/0087480 A1    Mar. 24, 2022

Related U.S. Application Data

(63) Continuation of application No. 15/551,486, filed as application No. PCT/US2016/018335 on Feb. 17, 2016, now Pat. No. 11,103,107.
(Continued)

(51) Int. Cl.
*A47J 43/07* (2006.01)
*B01F 35/60* (2022.01)
(Continued)

(52) U.S. Cl.
CPC ....... *A47J 43/0777* (2013.01); *A47J 43/0766* (2013.01); *B01F 35/6052* (2022.01); *B01F 2101/1805* (2022.01); *F16P 1/00* (2013.01)

(58) Field of Classification Search
CPC .................................................. A47J 43/0766
(Continued)

(56) References Cited

U.S. PATENT DOCUMENTS 5,533,806 A   7/1996 Veltrop
6,513,966 B1  2/2003 Gort-Barten et al.
(Continued)

FOREIGN PATENT DOCUMENTS

AU   2007228489 B2   9/2007
EP      0046169       2/1982
WO     97034518       9/1997

OTHER PUBLICATIONS

Machine translation of Description of EP 0046169 A. Generated Aug. 28, 2024.*
(Continued)

*Primary Examiner* — David L Sorkin
(74) *Attorney, Agent, or Firm* — Dinsmore & Shohl LLP

(57) ABSTRACT

A blending system is shown and described herein. The blending system may include a base including a motor, a blade selectively and operably engaged with the base, where the motor rotates the blade, a container having an open end and a lid configured to cover the open end. The blending system may also include an interlock system that may include a plurality of induction coils positioned on the base and the container and be in electrical communication with at least one lid sensor, wherein the power is translated through the induction coils to engage a switch device to complete a power circuit to allow a user to operate the motor of the blender.

16 Claims, 19 Drawing Sheets

Related U.S. Application Data

(60) Provisional application No. 62/152,380, filed on Apr. 24, 2015, provisional application No. 62/117,090, filed on Feb. 17, 2015.

(51) Int. Cl.
 *B01F 101/00* (2022.01)
 *F16P 1/00* (2006.01)

(58) Field of Classification Search
 USPC ........ 241/37.5; 366/205, 306, 314, 601, 206
 See application file for complete search history.

(56) References Cited

U.S. PATENT DOCUMENTS

| | | | |
|---|---|---|---|
| 7,018,091 | B2 | 3/2006 | Arroubi et al. |
| 8,807,818 | B2 | 8/2014 | Hirohata |
| 11,103,107 | B2 * | 8/2021 | Kolar ............... A47J 43/0777 |
| 2002/0079393 | A1 | 6/2002 | Karkos et al. |
| 2004/0100862 | A1 | 5/2004 | Arroubi |
| 2013/0074706 | A1 | 3/2013 | Fevre |
| 2014/0286120 | A1 | 9/2014 | Kolar |
| 2014/0286123 | A1 * | 9/2014 | Arnett ............... A47J 43/0766 366/205 |
| 2015/0035381 | A1 | 2/2015 | Mach et al. |

OTHER PUBLICATIONS

Machine translation of Claims of EP 0046169 A. Generated Aug. 28, 2024.*

Patent Cooperation Treaty (PCT), International Search Report and Written Opinion for Application PCT/US2016/018335 filed Feb. 17, 2016 mailed Jul. 11, 2016, International Searching Authority, US.

Supplementary European Search Report for Application No. 16753005.4 relating to PCT/US2016018335, dated Nov. 15, 2018, 8 pages.

* cited by examiner

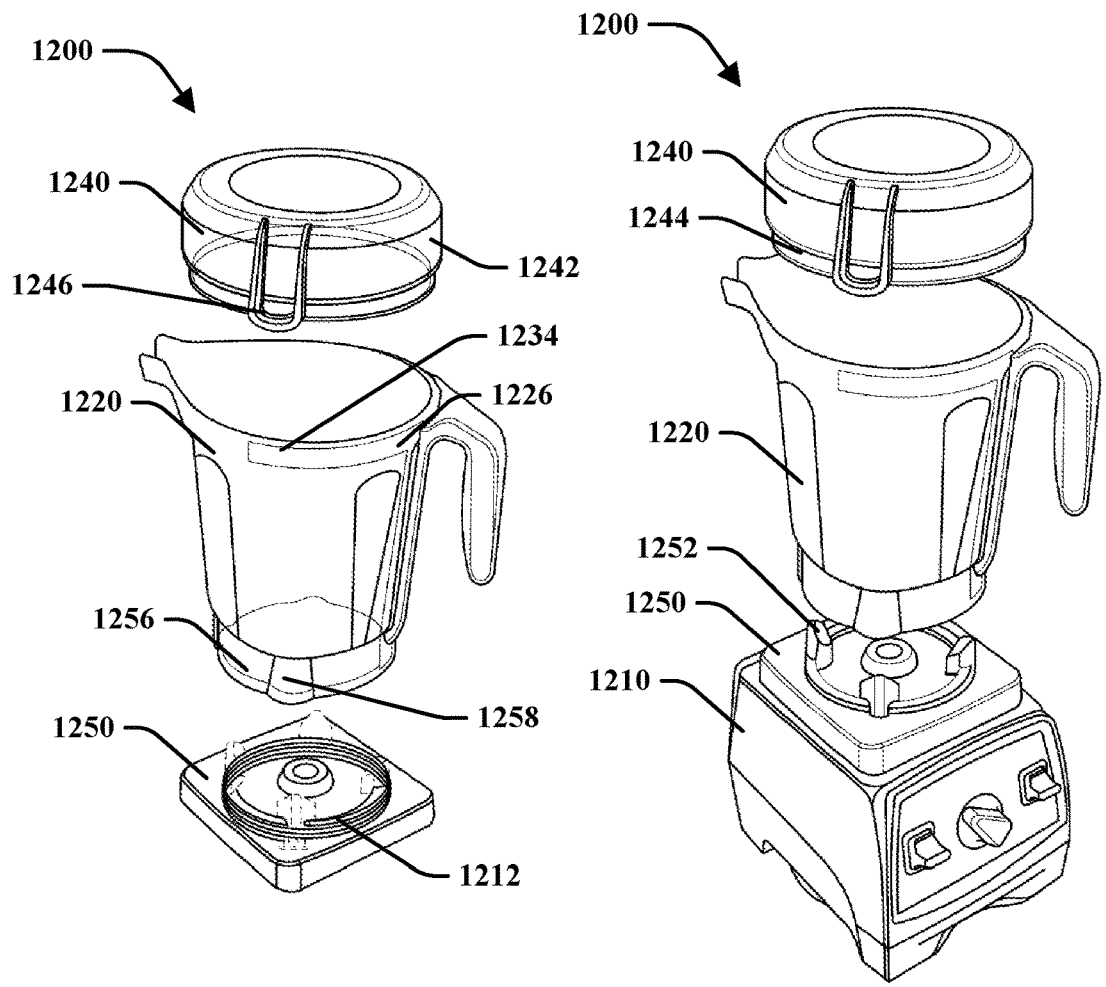
FIG. 12
FIG. 13
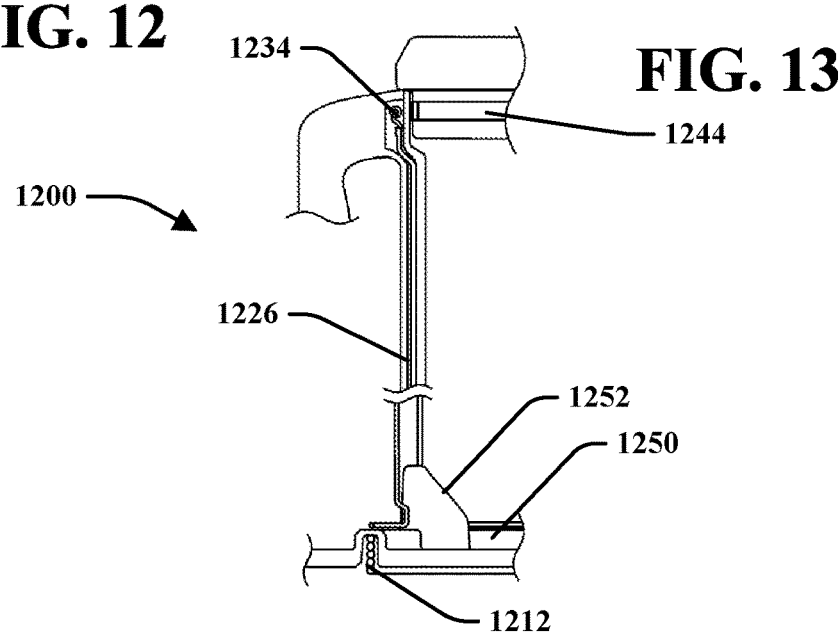
FIG. 14

INTERLOCKING BLENDING SYSTEM

CROSS-REFERENCE TO RELATED APPLICATION

This application is a continuation of U.S. Utility application Ser. No. 15/551,486 filed on Aug. 16, 2017 entitled "INTERLOCKING BLENDING SYSTEM" which claims the benefit of International Application No. PCT/US2016/018335 filed on Feb. 17, 2016 entitled "INTERLOCKING BLENDING SYSTEM" which claims priority to U.S. Provisional Application No. 62/117,090 entitled "INDUCTIVE INTERLOCK SYSTEM," filed on Feb. 17, 2015, and U.S. Provisional Application No. 62/152,380 entitled "INDUCTIVE INTERLOCK SYSTEM," filed on Apr. 24, 2015, which are hereby incorporated by reference in their entirety.

TECHNICAL FIELD

The present teachings relate to a system for interlocking a blender device, and more particularly, to a blender system utilizing wireless transmissions to safely interlock a blending system.

BACKGROUND

Blending systems are often used to blend and process foodstuffs. Conventional blenders generally include a base with a motor, a mixing container with an operable mixing blade disposed therein. A blender lid is adapted to cover the mixing container. A user inserts contents within the mixing container to be mixed by the rotation of the blade. The mixing container is positioned on the base as a user controls operation of the motor within the base to rotate the mixing blade within the mixing container to mix the contents therein.

It may be desirable to generally prevent the mixing blades from rotating when the blender lid is removed from the mixing container. Interlocking systems may be utilized to attempt to prevent the mixing blades from rotating when the blender lid is not operatively positioned on the mixing container. These interlock systems generally prevent operation of the rotation of the mixing blade unless the blender lid is covering the mixing container.

Known blending interlock systems have been disclosed by U.S. Pat. No. 8,403,556 to Wu to include a latch cover mechanism with a link rod and a compression spring in communication with a power circuit control switch in the base of the blender.

Additionally, U.S. Pat. No. 8,702,300 to Audette discloses a blending apparatus having a container, a lid for covering the container, and an attachment within the container. The attachment engages the lid and a drive member at the base of the blender to actuate a motor once the lid is secured to the container.

Typically, known blender interlocks require a physical connection between the lid and the motor. These interlocks generally include a system of mechanical arms, links, springs or other attachments that prevent the user from operating the motor to rotate the mixing blade unless the blender lid is secured onto the container.

However, the problem with these interlock systems on many consumer products is that they include mechanisms that can be ineffective at consistently providing a signal the blender lid is in place when, in fact, it is not. Additionally, mechanical interlock systems take up extra space for mechanical connection paths and these connection paths may not allow for sufficient vibration isolation or dampening. Generally, known blender system interlocks are subject to operational limitations caused by vibrations of the operating motor. Further still, these mechanical systems may be difficult to clean.

Therefore, a need exists for interlock systems that reduces the risk of inconsistent operation, takes up less space, and are not subject to an increase in operational issues caused by motor vibration.

SUMMARY

A container interlock system may include a base and a container operably engaged with the base, where the container includes an open end. A lid may selectively attach to the container to cover the open end. An interlock assembly having a plurality of induction coils may be provided to engage a switch device when the lid is attached to the container to cover the open end and the container is operably engaged to the base. The interlock assembly may include at least one transmitter coil and at least one receiver coil mounted to a pad positioned on the base. The transmitter coil may be in electrical communication with a power source, and the receiver coil may be in electrical communication with the switch device. The transmitter coil may be isolated electronically from the receiver coil when the container is not positioned on the base.

The container may include a bridge coil assembly. The bridge coil assembly may include a first coil in electronic communication with a second coil. The first and second coils may be in communication with at least one lid switch. The lid switch may be provided generally adjacent the open end of the container and be engaged to provide a signal or complete a bridge circuit when the lid is attached to the container to cover the open end.

The interlock assembly may provide selective power to the switch device that may permit operation of a motor when the first coil is in electromagnetic communication with the transmitter coil, the second coil is in electromagnetic communication with the receiver coil, and the lid switch is engaged. The selective power may be generated by the interlock assembly as the lid is attached to the container and the container is positioned on the base.

The lid switch may be a reed type switch and the lid may contain magnets configured to engage the reed switches when the lid is attached to the open end of the container. Alternatively, the transmitter and receiver coils may be mounted to a printed circuit board.

In another embodiment, provided is a blending system that may include a base encasing a motor, a blade within a container, and a lid to cover an open end of the container. An interlock detector may be attached to the base for detecting a position of the lid relative to the container to allow operation of the motor.

An interlock detector assembly may be adapted to provide a signal when the lid is attached to the container to cover the open end and the container is operably engaged to the base. The interlock detector assembly may be positioned on a pad or circuit board and may be mounted to the base. The interlock detector assembly may include a first induction coil assembly on the pad and a second induction coil assembly on the container. The second induction coil assembly may be in communication with at least one lid switch positioned adjacent the open end of the container that may identify if the lid is attached to or covers the open end.

The interlock detector assembly may be adapted to provide power to a relay switch when the lid covers the open end of the container and the container is operably engaged to the base. The first induction coil assembly may include at least one transmitter coil and at least one receiver coil. The transmitter coil may be in electrical communication with a power source and the receiver coil may be in electrical communication with the relay switch for a motor. The transmitter coil may be electromagnetically isolated from the receiver coil when the container is not positioned on the base or the lid is detached from the open end of the container.

The second induction assembly may include a first inductor in electronic communication with a second inductor. The first and second inductors may be in communication with at least one lid switch. The lid switch may be provided adjacent the open end of the container and be configured to provide a signal when the lid is attached to the container to cover the open end.

The interlock detector assembly may provide selective power to engage a switch that would permit operation of a motor when the first contactor is in communication with the transmitter coil, the second contactor is in communication with the receiver coil, and the lid covers the container.

DESCRIPTION OF THE DRAWINGS

The present teachings may be better understood by reference to the following detailed description taken in connection with the following illustrations, wherein:

FIG. 12 is a partial cross-sectional, prospective view of a container, lid, and pedestal of a blending system including one or more sensing coils in in accordance with the present disclosure;

FIG. 13 is an exploded, prospective view of the blending system of FIG. 12 in accordance with the present disclosure;

FIG. 14 is a partial cross-sectional, side view of the blending system of FIG. 12 in accordance with the present disclosure;

DETAILED DESCRIPTION

Figure 1A:
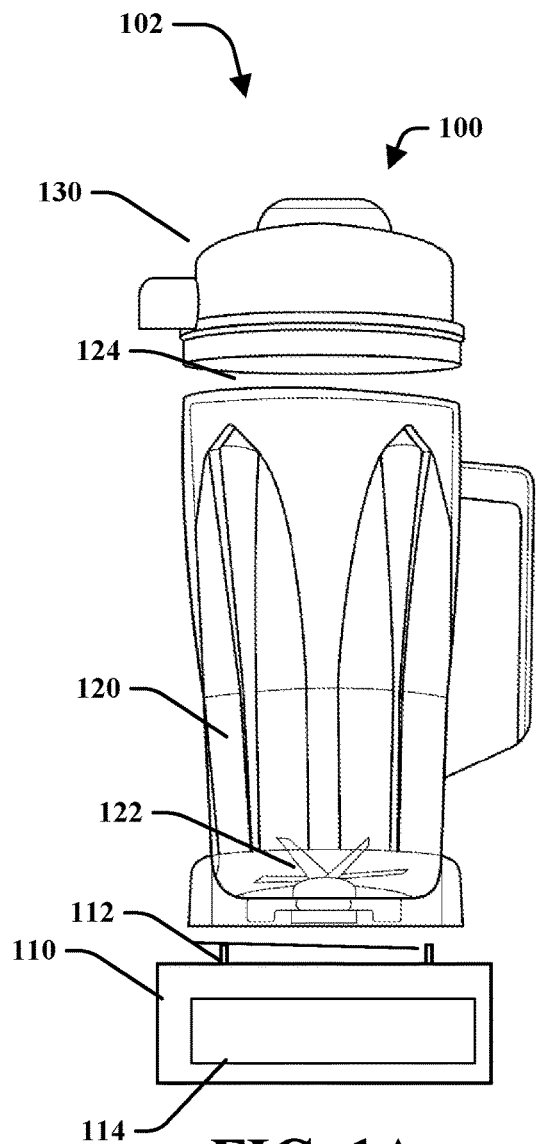
FIG. 1A is a front view of an embodiment of a blender system in a non-interlocked state in accordance with the present disclosure.

Reference will now be made in detail to embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined, switched, or altered without departing from the scope of the present teachings, e.g., features of each embodiment disclosed herein may be combined, switched, or replaced with features of the other embodiments disclosed herein. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

It is noted that references to a blender, blender system, and the like, are understood to include food processor systems, and other mixing systems. Such systems generally include a blender base that may include a motor, a blade assembly, and a controller. Further, such systems may include a container, a display, a memory and/or a processor. A blade assembly, a blending container, and a blender base may removably or irremovably attach. The blending container may be powered in any appropriate manner, such as disclosed in U.S. patent application Ser. No. 14/213,557, entitled Powered Blending Container, which is hereby incorporated by reference.

Furthermore, while blending of "ingredients," "contents" or "foodstuffs" is described by various embodiments, it is noted that non-food stuff may be mixed or blended, such as paints, epoxies, construction material (e.g., mortar, cement, etc.), and the like. Moreover, blending of ingredients or may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Further, such terms are not intended to limit possible blended products and should be viewed as examples of possible blended products.

In embodiments, the blending systems may include any household blender and/or any type of commercial blending system, including those with covers that may encapsulate or partially encapsulate the blender. Commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

As used herein, the phrases "blending process," "blending program," and the like are used interchangeably unless context suggest otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

Generally, wireless transmission may be the transmission of electrical signals from a power source to a device without using solid wires or conductors. This form of transmission uses time-varying electromagnetic fields and may be useful in cases where solid wires or contacts are undesired.

A blending system with interlocking capabilities is described herein. In an aspect, embodiments generally include a blender base (housing a motor), a container, and a lid. In an aspect, the blender system can determine whether the blender base, container, and lid are "interlocked" (i.e., they are in an operative position whereby a user is prevented from contacting the blades). The blender system may include inductive and/or magnetic components disposed in at least one of the blender base, container, or lid. When the blender system is fully connected, the inductive components may interact with each other. The interaction may induce current flow to, for example, complete a circuit and/or allow operation of a motor, which allows the blades to rotate within the container.

This disclosure provides various exemplary embodiments. The embodiments may be altered, arranged, or modified as desired such that a blending system selectively allows operation of a motor and/or blade assembly. For instance, containers, bases and/or lids of different figures may be interchanged. Further, while an embodiment may not show a particular aspect (e.g., pushrod, light sensor, inductive coil, switch, magnet, etc.), it is noted that modifications may be made to the embodiment to include the not shown aspects. In this manner, this disclosure provides for numerous embodiments that may be selectively utilized to determine whether a blending system is interlocked and/or to selectively allow operation of a motor or blade assembly.

Figure 1B:
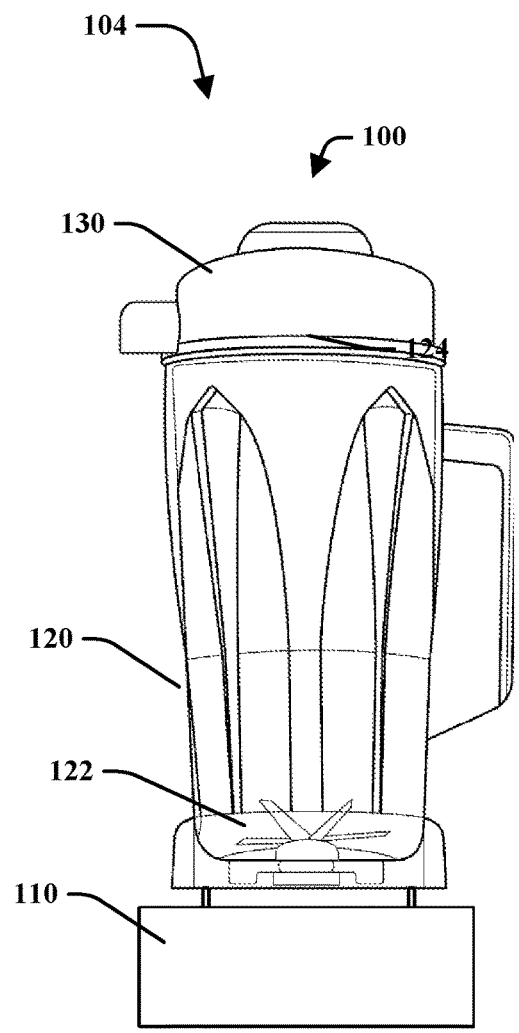
FIG. 1B is a front view of the blender system of FIG. 1A in an interlocked state in accordance with the present disclosure.

Referring now to FIGS. 1A and 1B, there depicted is a front view of a blending system 100 in a non-interlocked state 102 and an interlocked state 104. The blending system 100 may primarily include a base 110, a container 120, and a lid 130. The base 110 may be any appropriate size and configuration. The base 110 may house and generally protect the operative components of the blending system 100, such as a motor, fan, controllers, circuitry, human interfaces (e.g., touch screen, LED or LCD displays, lights, buttons, knobs, dials, or other actuators), and the like. As illustrated, the base 110 may include a control panel 114 positioned on a face of the base 110 such that a user may interact with the control panel 114. The control panel 114 may be of any appropriate configuration and may allow a user to set the operative condition of the blending system 100. It will be appreciated that the control panel 114 may include one or more human interfaces.

Container 120 may include and/or be coupled with an agitator or blade assembly 122. The blade assembly 122 may be of appropriate configurations and may be configured to rotate within the container 120 (e.g., via a motor). For instance, a user may place foodstuff within the container 120 to allow blade assembly 122 to chop, mix, blend, or otherwise interact with the foodstuff.

In interlocked state 104, the container 120, base 110, and lid 130 may be interconnected in an appropriate manner. For instance, lid 130 may be attached or coupled to an open end 124 of container 120. According to an embodiment, the lid 130 may be press-fit (e.g., friction fit) within or about the open end 124, twisted (e.g., via threaded members), latched, or otherwise connected with the open end 124. It is noted that lid 130 and container 120 may be coupled via various other means, including magnetic means, VELCRO, mechanical fasteners, or the like.

Furthermore, container 120 may be attached to or otherwise operatively engaged with the base 110. In at least one embodiment, base 110 may include protrusions 112 that guide the alignment of container 120. It is noted that the container 120 may be attached to the base by threaded members, fasteners, press-fit geometries, magnetic means, or the like. In at least one embodiment, the weight of container 120 may provide sufficient force to maintain a connection between base 110 and container 120.

Blade assembly 122 may include a splined shaft that operatively engages with a splined coupling of the base 110. For instance, when the container 120 is operatively placed on base 110, the splined coupling receives the splined blade shaft, which depends downwardly from the bottom of the container 120. A motor may drive the splined coupling which, in turn, drives the splined blade shaft. Driving of the splined blade shaft causes rotation of the blade assembly 122 within the container 120.

In the non-interlocked state 102, the container 120 is not operatively connected to at least one of the lid 130 or base 110. It is noted that FIG. 1A depicts the container 120 as not operatively connected to both the lid 130 and base 110. According to embodiments, the blending system 100 may prevent or prohibit operation of the motor when in the non-interlocked state 102 and may allow or enable operation of the motor when in the interlocked state 104. Alternatively or additionally, when in the interlocked state 104, the blade assembly 122 may be prevented from rotating.

Embodiments will be described herein with reference to FIGS. 1A and 1B. It is noted that the configurations of base 110, container 120, and lid 130 are provided for reference and example. As such, various other configurations are within the scope and spirit of this disclosure.

Figure 2:
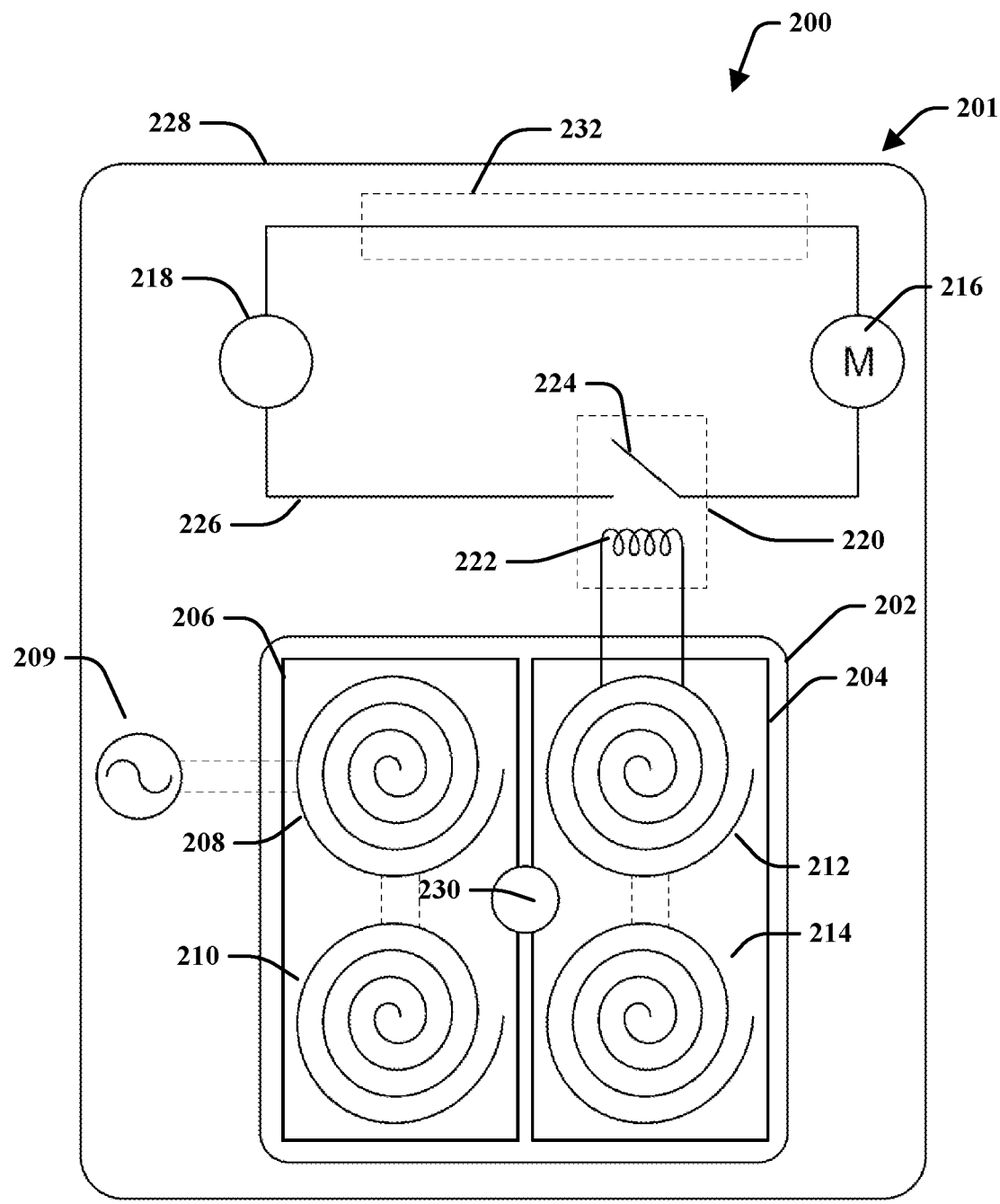
FIG. 2 is a schematic diagram of a base including one or more inductive coils in accordance with the present disclosure.
Figure 3:
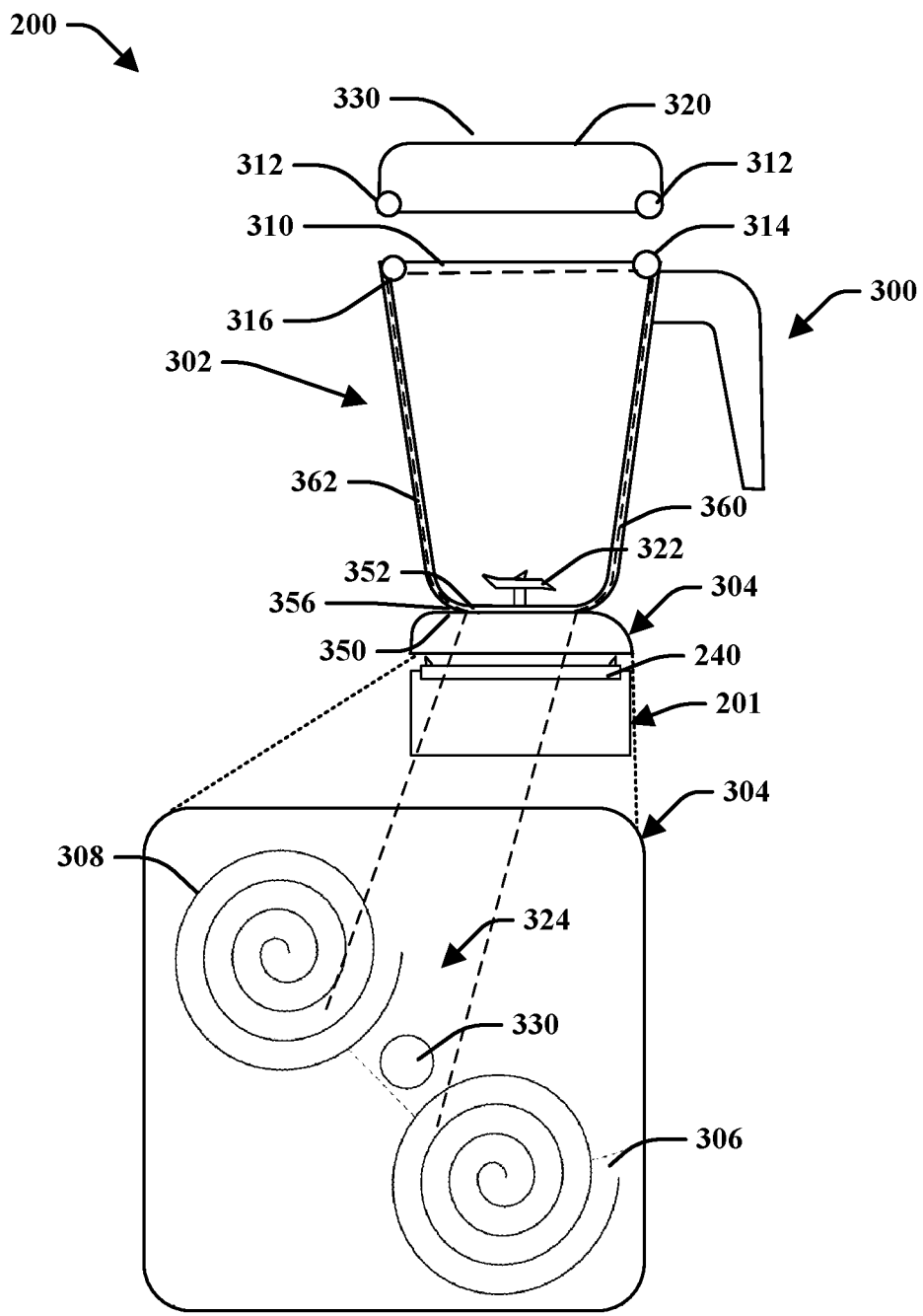
FIG. 3 is a partial cross-sectional view of a blender system including the base of FIG. 2 in accordance with embodiments of the present disclosure.

Turning to FIGS. 2 and 3, a blender system 200 including base 201, container 300, and lid 320 are depicted. The blender system 200 may disable one or more operations of base 201 (e.g., disable actuation of a motor and/or blade assembly) when the blender system 200 is in a non-interlocked state 102.

Base 201 may utilize wireless transmissions to control a power supply that enables operation of a motor 216 and/or blade assembly 322. Base 220 may include a housing 228 that may house the motor 216 and other operative components. The motor 216 may be in operative communication with a power supply 218 by way of a power circuit 226. For instance, motor 216 may receive power from power mains, a battery, or the like. In an example, the motor 216 may utilize the power to rotate the blade assembly 322 when the container 302 is operatively engaged with the base 201. It is noted that other components (e.g., a control panel 232, display, etc.) may be coupled to power supply 218. In an aspect, the other components may be connected via power circuit 226 or via another power circuit (not shown). For instance, power may be supplied to an LCD screen independent of power supplied to a motor 216.

The power circuit 226 may include a switch device 220 that may be of any appropriate configuration—the present teachings are not limited to the configurations shown and described herein. The switch device 220 may include a relay switch 224 that may be configured to operatively alter states between an open and closed state. In a closed state (not shown), the relay switch 224 completes the power circuit 226 to allow a user to operate the motor 216 and/or blade assembly 322. In an open state, the relay switch 224 breaks the power circuit 226 to prevent power flow to the motor 216. The relay switch 224 may be closed when an inductor 222 is engaged as will be described in more detail herein.

The housing 228 may include or house a circuit board 202 (e.g., printed circuit board). The circuit board 202 may be of any appropriate shape and size and may be materially integral with the blender base 201 or separately mounted thereon. The circuit board 202 may include one or more inductive pads or other circuitry, including inductive coils. In an embodiment, a first inductive pad may comprise at least one transmitter assembly 206 and a second inductive pad may comprise at least one receiver assembly 204. It is noted transmitter assembly 206 and receiver assembly 204 may be mounted to the circuit board 202 or may be otherwise disposed within or on housing 228. The circuit board 202 and the base 201 may be of any appropriate configuration.

The transmitter assembly 206 may include a first transmitter coil 208 and a second transmitter coil 210 that are in general electric communication along the circuit board 202. The transmitter assembly 206 may be in electrical communication with a power source 209 (e.g., power mains, battery, power source 218, etc.). The transmitter assembly 206 may be an arrangement of coils or conductors of any induction type configuration that is configured to transmit power by electromagnetic fields across an intervening space.

The receiver assembly 204 may include a first receiver coil 212 and a second receiver coil 214 that may be in general electric communication along the circuit board 202. The receiver assembly 204 may be in electric communication with the switch device 220. The receiver assembly 204 may be an arrangement of coils or conductors of any configuration that receives power by electromagnetic fields across an intervening space. Such coils may be electrically coupled to inductor 222. The receiver coil assembly 204 may be electromagnetically isolated from the transmitter assembly 206, such that current flow through the first and second transmitter coils 208 and 210 may not induce current through first and second receiver coils 212 and 214. If current flows through the receiver coils 212 and 214, the current will pass through the inductor 222. Current through the inductor 222 will close the relay switch 224, completing the power circuit 226. This arrangement allows the motor 216 to be powered by the motor power source 218 subject to the use of the control panel 232. Thus, absent a bridge, the motor 216 will be disabled.

Turning to FIG. 3, depicted is a schematic diagram of the blending system including base 201, container 302, and lid 320. In an aspect, the container 302 may comprise an apron 304 or engagement portion at a closed end (as described in more detail herein), and an open end 310 configured to receive and/or couple with the lid 320. The container 302 and/or lid 320 may comprise bridge circuitry, including a bridge circuit assembly 324 and one or more switches (e.g., read switches 314).

In an aspect, bridge circuit assembly 324 may include one or more inductive coils, such as first coil 306 and second coil 308. The first and second coils 306, 308 may comprise a coil that is disposed within apron 304, adhered to apron 304 (e.g., on a first or bottom side 350 opposite the blender blade, on a second or top side 352, etc.), disposed within a wall 356, or the like. It is noted that the first and second coils 306, 308 may be disposed in a location that allows, when blending system 300 is selectively assembled, for reception or transmission of an electronic signal from first or second coils 306, 308 to one or more of first transmitter coil 208, second transmitter coil 210, first receiver coil 212 or second receiver coil 214, as described in more detail herein.

The first and second coils 306, 308 may be in electric communication with one or more switches, such as first and second lid switches 314 and 316. For instance, a first connection line 360 may electrically couple first coil 306 with first lid switch 314, and a second connection line 362 may electrically couple second coil 308 with second lid switch 316. It is noted that first and second lid switches 314 and 316 may be electrically coupled with each other, such as through wire coupling, flexible circuit board coupling, or the like. According to described embodiments, when either first or second lid switches 314, 316 are open, the bridge circuit assembly 324 is incomplete; when both first and second lid switches 314, 316 are closed the bridge circuit assembly 324 is complete (e.g., the circuit is complete), allowing for flow of an electrical signal between first coil 306 and second coil 308.

The lid switch 314 may be provided adjacent or proximal the open end 310 of the container 302 and be configured to be closed when the lid 320 is attached to the container 302 to cover the open end 310. In one embodiment, the first and second lid switches 314, 316 may be one or more of a reed switch, mechanical switch, Hall-Effect sensors, or the like. The first and second lid switches 314, 316 may be selectively engaged by one or more actuators within the lid 320 (e.g., a wall of lid 320, a magnet, a protrusion or notch, etc.). For example, the first and second lid switches 314, 316 may be reed switches, and the lid 320 may include one or more magnet(s) 312, which may magnetically engage the first and second lid switches 314, 316. It is noted that the magnets 312 may comprise a magnetic band disposed within or about the lid, n magnets (where n is a number), or the like. In at least one example, the magnets 312 may be positioned in a predefined location, such that the magnets only engage the first and second lid switches 314, 316 when lid 320 is operatively secured to the container 302. It is noted that the quantity and location of lid switches and/or magnets may be of any appropriate configuration.

According to one or more embodiments, the various circuitry components of lid 320 and/or container 302 may be protected from an external environment and/or exposure to foodstuffs. For instance, connection lines 360, 362 may be disposed within wall 356 of container 302. As an example, connections lines 360, 362 may comprise one or more wires (e.g., which may be comprised within a flexible circuit) that are disposed or suspended within glass, plastic, between an inner and outer wall of a double walled container, or the like. In another example, wires may be disposed on an outer surface of container 302 and sealed by a protective coating or layer. In a similar aspect, first and second lid switches 314, 316 may be disposed within wall 356, sealed on a surface of wall 352, or the like. It is noted that the container 302 and/or lid 320 may be dishwasher safe and/or safe from exposure to other harsh environments.

In an aspect, magnets 312 may be disposed within a body 330 of lid 320 (e.g., within a rubber, plastic, or other material comprising the lid), may be partially exposed, and/or may be attached to a surface of lid 320. It is noted that magnets 312 may be selectively coupled or attached to lid 320. For instance, magnets 312 may be configured to attach to one or more makes or models of lids based on whether the lid 320 may be operatively used with blender system 300. This may allow magnets 312 to selectively attach to retrofit existing lids for use with system 300.

Referring now to base 201, as depicted in FIGS. 2 and 3, the container 302 may be configured to selectively attach, engage, or mate with base 201. When the container 302 is operably positioned on the base 201, first and second coils 306, 308 are each generally aligned adjacent to at least one coil of the base 201 (e.g., first transmitter coil 208, second transmitter coil 210, first receiver coil 212 and/or second receiver coil 214). This may position the coils of the container 302 to receive (e.g., from first or second transmitter coil 208, 210) an electrical signal and selectively transmit an electrical signal to a receiver (e.g., first or second receiver coil 212, 214), as described in more detail herein.

In an embodiment, the power source 209 provides current to the transmitter assembly 206 which is electrically isolated from the receiver assembly 204 along the circuit board 202 (e.g., and/or on a different circuit board). The container 302 may be operably engaged with the base 201 such that an engagement portion 304 is aligned with the circuit board 202. It is noted that container 302 may be positioned such that at least one of first coil 306 or second coil 308 may be adjacent to at least one of first or second transmitter coil 208, 210. In another aspect, the first or second coal 306, 308 that is not adjacent to a transmitter coil, may be adjacent to at least one of first of second receiver coil 212, 214. In this manner, the container 302 may be attached to the base 201 at one or more positions. For simplicity of explanation, references will be made to coils in a specific arrangement. It is noted, however, that system 300 may be configured in other arrangements.

In an aspect, the first coil 306 may be placed within a threshold proximity or distance to the transmitter assembly 206 such that the first coil 306 may be inductively coupled to the transmitter assembly 206 when power is supplied to the transmitter assembly 206. If the lid 320 is attached to the open end 310 of the container 302, the magnets 312 may engage first and second lid switches 314 and 316. When the first and second lid switches 314 and 316 are engaged or closed, an electric signal may pass from first coil 306, through the connection lines, to the second coil 308. If the lid 320 is detached or otherwise not operatively attached, the first and second lid switches 314, 316 will open to prevent current flow to second coil 308.

Second coil 308 may be placed in close proximity to the receiver assembly 204 such that the second coil 308 may be inductively coupled to the receiver assembly 204. For instance, second coil 308 may be positioned a threshold distance from receiver assembly 204 to allow second coil 308 to induce current in the first receiver coil 212 or the second receiver coil 214 of the receiver assembly 204. It is noted that the threshold distance may depend on the characteristics of the coils (e.g., size, gauge, etc.), amount of current or voltage, or the like.

Accordingly, when the blender system 300 is operatively connected/assembled (e.g., similar to FIG. 1B), an electrical signal may travel from the transmitter assembly 206 to the bridge coil assembly 324 (e.g., through one or more coils, switches, or other circuitry), and to the receiver assembly 204. The receiver assembly 204 may provide the signal (e.g., current, voltage, etc.) to the inductor 222 which engages the relay switch 224 within power circuit 226. This arrangement allows the motor 216 to be powered by the motor power source 218 subject to the use of the control panel 232. In response to removal of the container 302 and/or lid 320, the electrical path or circuit will break, which will open relay switch 224—cutting off power to motor 216.

It is noted that the container 302 may be of any configuration such that particular sides of the container 302 are not required to be aligned with a particular side of the circuit board 202 or base 201. The transmitter assembly 206 remains electromagnetically isolated from the receiver assembly 204 until the bridge coil assembly 324 is aligned across the transmitter assembly 206 and the receiver assembly 204 thereby inductively bridging the interlock circuit 200 across the circuit board 202. This configuration may occur as the lid switches 314 are engaged with the magnets 312.

By way of a non-limiting example, base 201 may comprise a pedestal 240 that may be sized and shaped to cooperate with the blade assembly 322 and apron 304 of the container 302. The pedestal 240 and the apron 304 may be of a shape such that the pedestal 240 corresponds with the external shape of an apron 304 or bottom portion of the container 302. In the present example, a rotatable shaft 330 of the blade assembly 322 may be rotatably engaged with a coupler 230 (e.g., a splined coupler) positioned along a portion of the base 201. The coupler 230 may be positioned at a central portion of the circuit board 202 and the pedestal 240. In this embodiment, the shape of the apron 304 of the container 302, the circuit board 202, and base 201 are generally complimentary. The motor 216 may be configured to rotate the coupler 230 to rotate the blade assembly 322 within the container 302.

Figure 4:
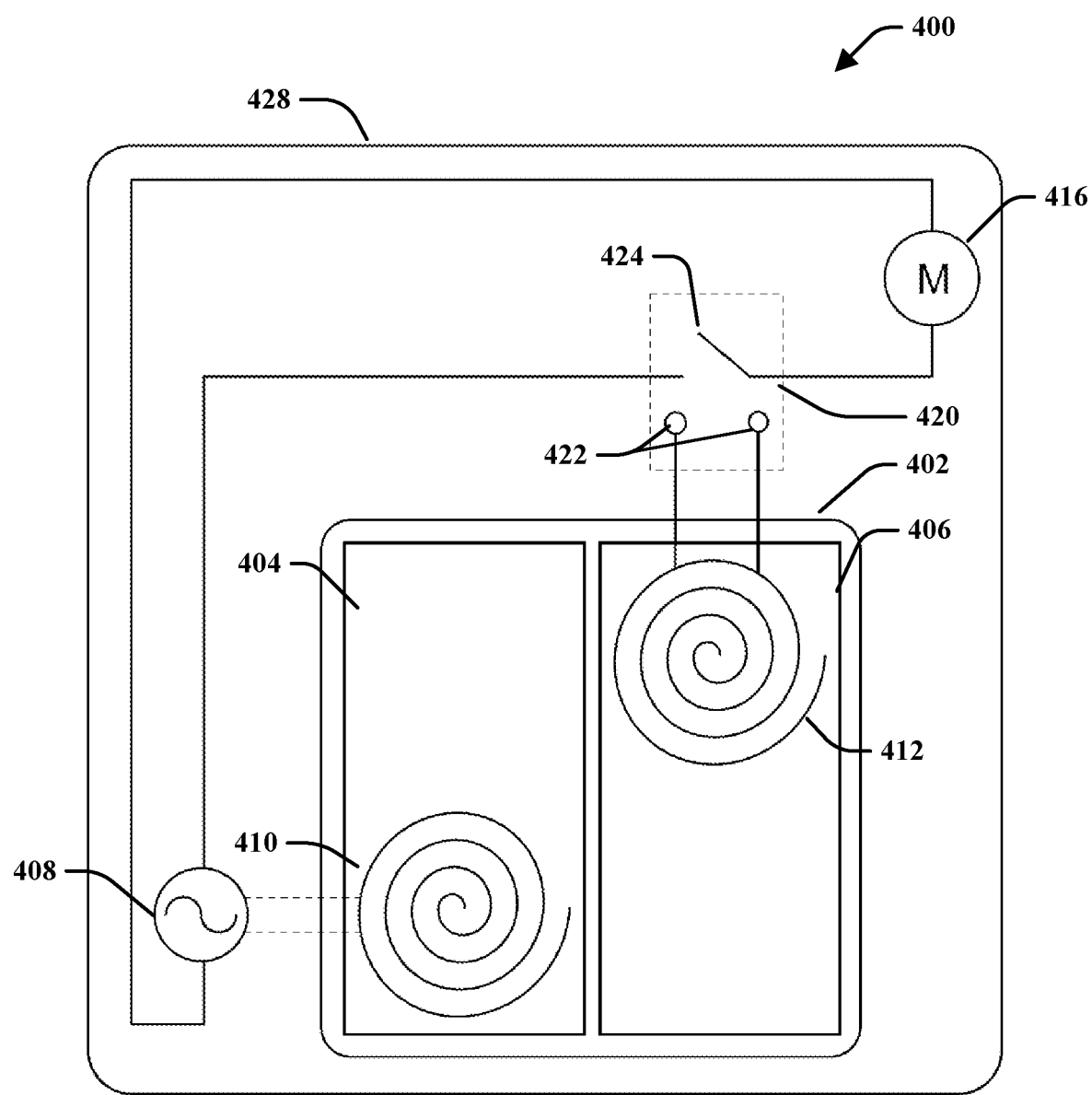
FIG. 4 is a schematic diagram of a base that includes two coils and a shared power source in accordance with embodiments of the present disclosure.

By way of a non-limiting example, as illustrated by FIG. 4, a base 400 may include p inductive coils, where p is a number (e.g., 1, 2, 3, 4 etc.). For instance, base 400 may include, two inductive coils that may interact with q inductive coils of a container (e.g., container 302), where q is a number (e.g., one or more). As illustrated, base 400 may include two or more inductive coils.

As depicted, base 400 may include a first induction coil assembly 404 and a second inductive coil assembly 406. The first inductive coil assembly 404 may include a first coil 410 on a circuit board, surface, or pad 402. The second inductive coil assembly 406 may include a second coil 412 on the pad 402. The first coil 410 may be electrically isolated from the second coil 412. In one embodiment, the power source 408 that operatively provides power to the first induction coil assembly 404 may also operatively provide power to the motor 416. Additionally, a switch device 420 may be a relay switch or logic gate configured to close the relay switch 424 when the second coil 412 engages relay switch 424 via actuators 422. Likewise, second coil 412 does not receive a signal and it does not engage relay switch 424, which brakes the flow of electricity to the motor, generally preventing rotation of the blades. In one embodiment, the switch device 420 may be a yes/no type logic gate.

Accordingly, the bases 200, 400 may identify that the lid 320 is in an open position (and/or the container 302, lid 320, and base are not operatively attached) and, in response, the motor 216, 416 may be configured to be disabled, i.e., not operate. When the motor 216, 416 is disabled, the blade assembly 322 may not be capable of operation. Therefore, in order to operate the blending system, the blending container 302 and blade assembly 322 may be operatively coupled with the blender base 201, 428 and the lid 320 may cover the open end 310. This generally prevents the user from being able to access the blade assembly 322 within the container 302 as they are rotating.

In these embodiments, the blending interlock 200 may continuously monitor the blending system to ensure it is in an operative condition. More specifically, once the induction circuits are disrupted, the switch device 220, 420 may automatically open thereby interrupting the power circuit 226 preventing current to flow to the motor 216. This configuration ensures that the lid 320 is attached to the container 302 and that the bridge coil assembly 324 along the apron 304 is in position along the transmitter assembly 206 and receiver assembly 204.

In an example, the disclosed blender systems may protect users of powered devices from mechanical and electrical harm. When a user operates the blending systems, the user may attempt to add ingredients into a container while the motor is running. If the user removes the lid, the blender system will automatically cut off or disable power to the motor. Likewise, if the user attempts to engage the motor without attaching the container and/or lid, the motor will not rotate. Embodiments describe a physical orientation and use of inductive coils on a pad or circuit board to create a physical—electromechanical based system. The interlock assembly may eliminate complex electronics and the need for comparative signal analysis, microprocessor-based decision-making or complex modulation of inductive signals. The disclosed interlock system may provide a robust and reliable system without the use of a microprocessor.

Figure 5:
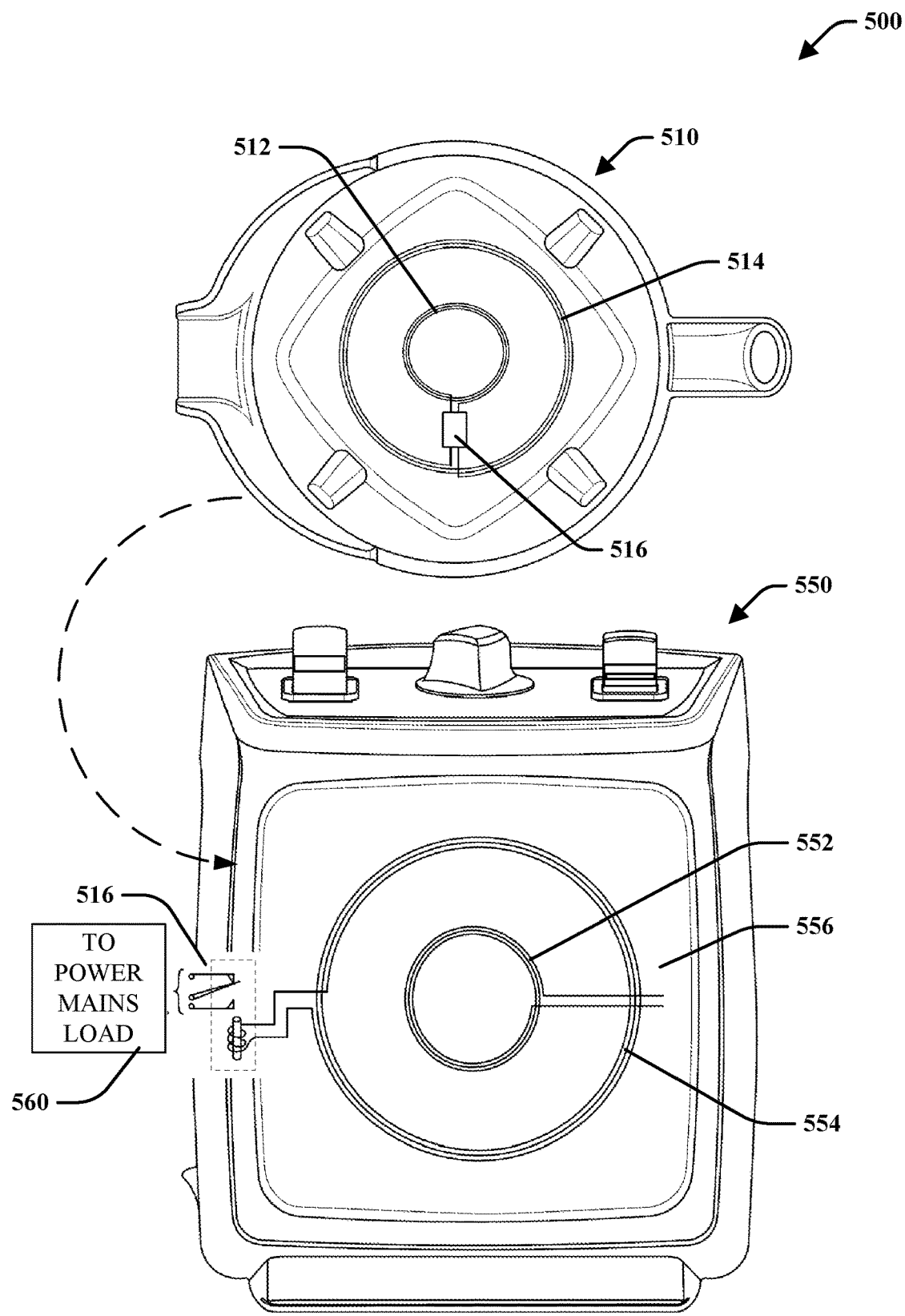
FIG. 5 is a perspective top view of a base and a bottom view of a container of a blending system that inductively interlocks in accordance with the present disclosure.

Turning to FIG. 5, there is a perspective view of a blender system 500. Blender system 500 may be utilized in blending applications or other appliance applications and may include a container 510 (as shown from below) and a base 550 (as shown from above). Container 510 and base 550 may be configured to control (e.g., enable, disable, etc.) power supplied to a blade or motor assembly. For instance, container 510 and base 550 may comprise transmitter coils that, when induced, may complete a switch or circuit, thereby selectively allowing electrical flow to the motor assembly.

Container 510 may include a plurality of coils (e.g., inner coil 512, outer coil 514, etc.) and a switch 516. It is noted that container 510 may include a different number of coils and/or arrangement of coils. For instance, while inner coil 512 and outer coil 514 are shown as interconnected and generally concentric, it is noted that inner coil 512 and outer coil 514 may not be concentric. It is further noted that the container 510 may include a different number of switches, such as 0, 3, etc. For example, base 550 may include a switch 516. In another aspect, system 500 may not include any switches.

Base 550 may include a transmitter coil 552 and a receiver coil 554. It is noted that base 550 may include a different number of coils and/or arrangement of coils. In an aspect, base 550 may include coils that are generally similarly in dimensions and arrangements as coils of container 510. For example, transmitter coil 552 and receiver coil 554 may be respectively similar in dimensions to inner coil 512 and outer coil 514. As depicted, transmitter coil 552 and receiver coil 554 may be generally concentric. It is further noted that while transmitter coil 552 is shown as having a generally smaller perimeter than and receiver coil 554 and as generally encompassed by receiver coil 554, other arrangements are within the scope and spirit of this disclosure. For instance, transmitter coil 552 may encompass receiver coil 554.

In at least one embodiment, transmitter coil 552 and receiver coil 554 may be disposed on a circuit board 556, such as through chemical deposition, physical bonding, mounting, printing, or the like. In another aspect, base 550 and/or container 510 may be a base or container of a legacy system that may receive coils and other circuitry. For instance, coils may be attached or coupled to base 550 and/or container 510 through adhesive bonding, physical/mechanical connection, or the like.

Blender system 500 may provide selective power from a power source, such as mains power connection 560 or a battery power source, to the switch 516 that may permit operation of a motor when the inner coil 512 is in electromagnetic communication with the transmitter coil 552 and the outer coil 514 is in electromagnetic communication with the receiver coil 554. The switch 516 may be a reed type switch or any other appropriate type of switch.

In embodiments, transmitter coil 552 may inject a high frequency signal from an isolated transmitter source, the source may be isolated from mains power connection 560 (or another power source). The transmitter coil 552 may be in electrical communication with a power source or signal generator/transmitter and the receiver coil may be in electrical communication with the switch and/or mains power connection 560. The transmitter coil 552 may be isolated electronically from the receiver coil 554 when the container is not positioned on the base.

It is noted that interlock system 500 may selectively enable/disable a motor while other operation of a blender system are permitted. For example, a display on blender base 550 may receive power and may operate independent of the interlock system 500. In another aspect, the display may communicate with interlock system 500 and may generate a status indicator of the interlock system 500. For instance, the status indicator may include an audible, visual, or other notification. The status indicator may provide information to a user to indicate whether the base 550 and the container 510 are connected or disconnected.

In another aspect, blender system 500 may include other or different components not shown for sake of brevity. For instance, interlock system 500 may include a lid (e.g., as described with reference to FIGS. 1-4). The lid may include inductive coils, switches, or other components. For example, interlock system 500 may be configured to enable/disable power to a motor based on proper connection of base 550, container 510, and a lid (not shown). While the base 550 has been described as comprising a transmitter coil 552 and a receiver coil 554, it is noted that other portions of interlock system 500 may include transmitters and/or receiver coils. For instance, container 510 may include transmitters and/or receivers.

Figure 6:
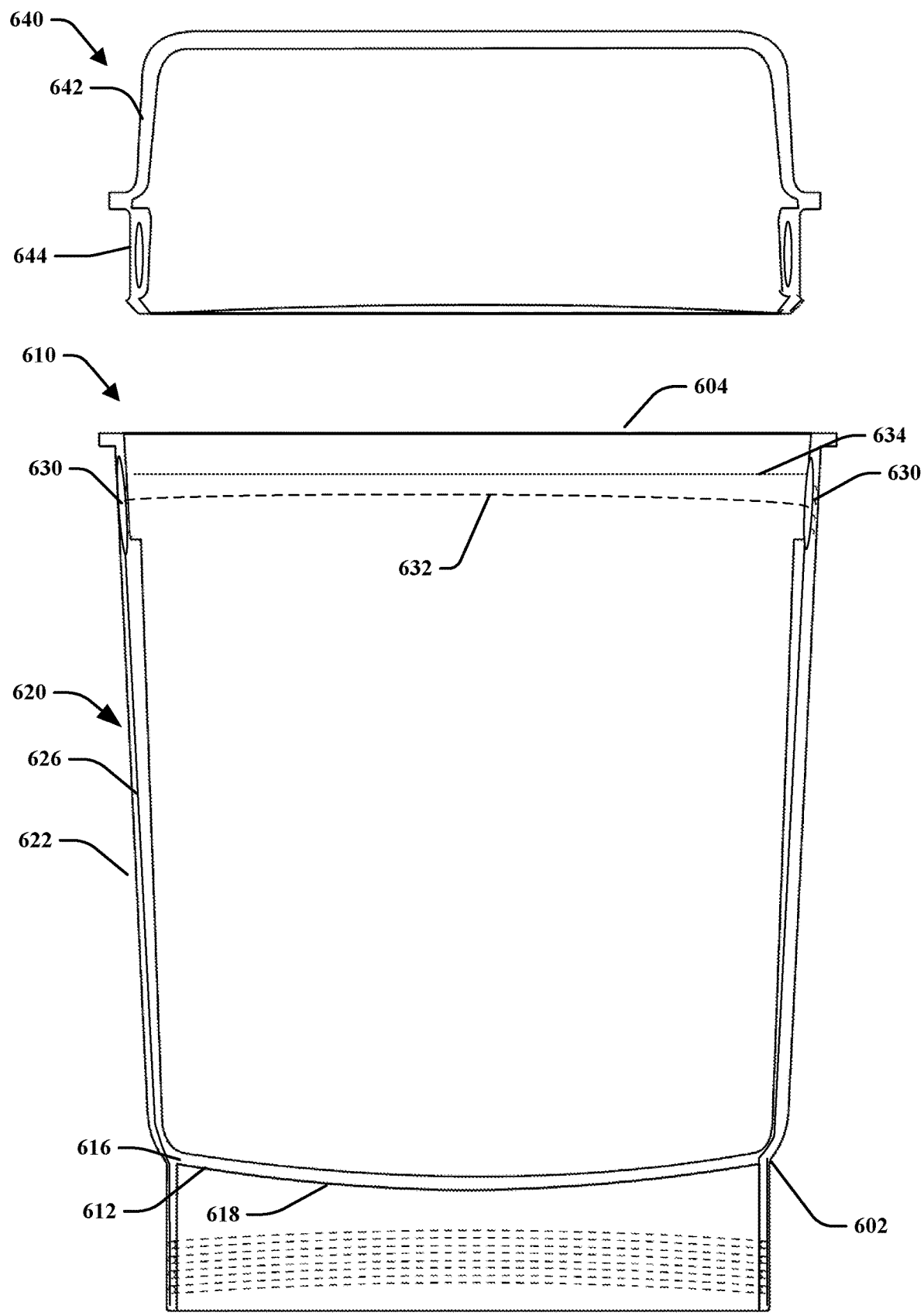
FIG. 6 is a partial cross-sectional, side view of a container that operatively couples with a lid including one or more actuators in accordance with the present disclosure.

Turning to FIG. 6, there illustrated is a cross-sectional, side view of container 610 and a lid 640, in accordance with various described embodiments. For instance, container 610 may comprise similar aspects as container 302, 510, etc. In another aspect, lid 640 may comprise similar aspects as lid 320. Container 610 and lid 640 may be utilize with a base of a blender to interlock a blending system, as described herein.

Container 610 may comprise one of more inductive coils 616 that may be disposed proximal to a closed end 602 and opposed an open end 604 of the container 610. Closed end 602 may comprise a bottom wall 612. The inductive coils 616 may be disposed within the bottom wall 618 and/or on a surface of the bottom wall 618 (e.g., such as bottom surface 612). Sidewalls 620 of container 610 may extend between closed end 602 and open end 604. Sidewalls 620 may comprise a connection wire 626 or line may connect the inductive coils 616 to one or more switches 630. In an aspect, the connection wire 626 may be disposed within the sidewall 620 (e.g., which may be a double walled or lined wall), on a surface of the side wall (e.g., outer surface 622), sealed or adhered on a surface, or the like.

In an aspect, switches 630 may be connected via a connection wire 632, which may be similarly disposed with respect to the connection wire 626. It is noted that container 610 may comprise m-switches, where m is a number (e.g., 1, 2, 3, 4, etc.). For instance, container 610 may comprise two or more switches generally evenly spaced about a perimeter 634 of container 610. Spacing the switches 630 may allow for detection of a partially connect lid and/or damaged lid. It is noted that the switches 630 may be disposed at regular or irregular intervals.

Lid 640 may comprise a body 642 comprising one or more appropriate materials, such as plastics, glass, metal, rubber, etc. The lid 640 may be sized and shaped to operatively attach to the container 610. In an aspect, the lid 640 may be press- or friction-fit within the open end 604 of container 610, may be a screw top-type lid, or the like. According to embodiments, one or more actuators 644 may be disposed within the body 642 of the lid 640. For instance, actuators 644 may be magnetic or metallic inserts that may actuate or engage switches 630. When all switches 630 are engaged, current may flow through container 610 to signify that the lid 640 and container 610 are operatively connected.

Figure 7:
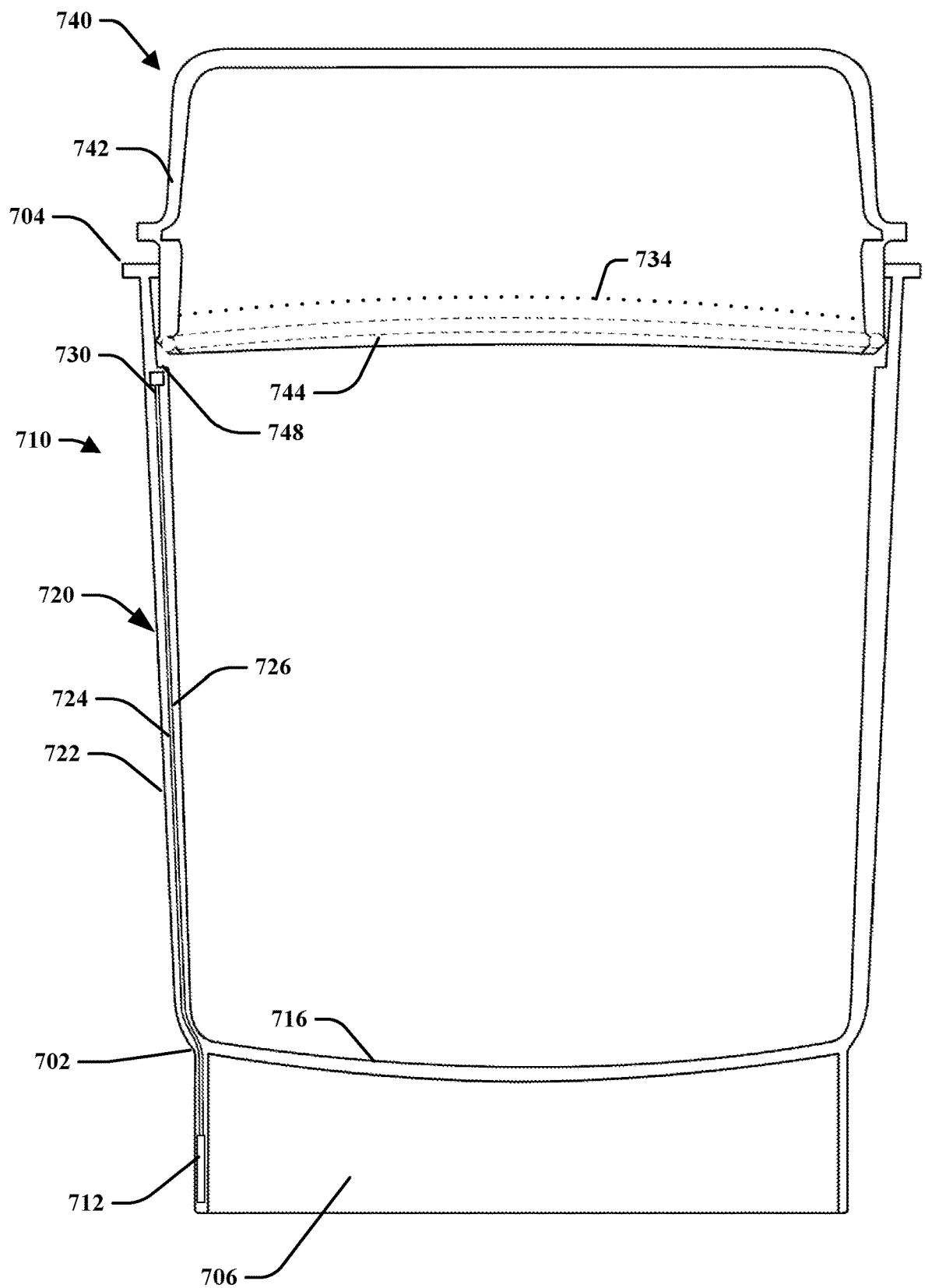
FIG. 7 is a partial cross-sectional, side view of a container that operatively couples with a lid including one or more magnets in accordance with the present disclosure.

Turning to FIG. 7, illustrated is an interlocking blender system 700 that may be utilized to identify when portions of the blender system 700 are appropriately connected. It is noted that the blender system 700 may include different components and/or aspects as described with reference to the various disclosed embodiments. In an aspect, blender system 700 may primarily include container 710, lid 740, and a blender base (not shown).

Container 710 may comprise a closed end 702 and an open end 704. Closed end 702 may include a bottom wall 716. Sidewalls 720 may extend from bottom wall 716 towards open end 704. An apron 706 may extend from bottom wall 716 in a direction generally opposed to open end 704. In an aspect, container 720 may include a contact 712 that may electrically communicate with a contact of a blender base. For example, contact 712 may comprise an exposed metal contact that may be configured to abut or interface with a metal contact of a blender base. When the contact of the blender base in energized, a signal may pass to the contact 712. It is noted that container 710 may comprise any number of contacts, may comprise different interfaces or methods of communication (e.g., one or more inductive coils, etc.), or the like.

Contact 712 may be coupled with one or more connection wires, such as connection wires 724 and 726. Connection wires 724, 726 may generally be disposed in or about sidewalls 722, as described herein. Connection wires 724, 726 may be coupled to a switch 730 (e.g., a reed switch, or the like). When the switch is open, connection wires 724 and 726 may be disconnected at the switch 730; when switch 730 is closed, the connection wires 724 and 726 may be connected to complete a circuit. In an aspect, switch 730 may be selectively opened or closed based on a status of lid 740 (e.g., closed, open, etc.). In an open status, lid 740 may be not-operatively connected or fully connected with container 710. In a closed status, the lid 740 may be operatively or fully connected with container 710.

Lid 740 may comprise a body 742 that may include an active member or triggering member 744 disposed therein or thereon. For instance, triggering member 744 may comprise a magnetic band disposed within or about a perimeter 734 of lid 740. The magnetic band may trigger or close switch 730 when a distance between the triggering member 744 and switch 730 is within a threshold distance. For instance, FIG. 7 depicts lid 740 in a partially open state. In this state, a distance 748 between triggering member 744 and switch 730 may be outside a threshold range, such that switch 730 remains open. If a user pushed lid 740 to further close the lid 740, the distance 748 will decrease, and eventually reach a threshold distance that will cause triggering member 744 to close switch 730. Likewise, if the user lifted lid 740 to increase the distance 748, then triggering member 744 would allow switch 730 to open, preventing operation of the motor and, in turn, preventing rotation of the blades.

Figure 8:
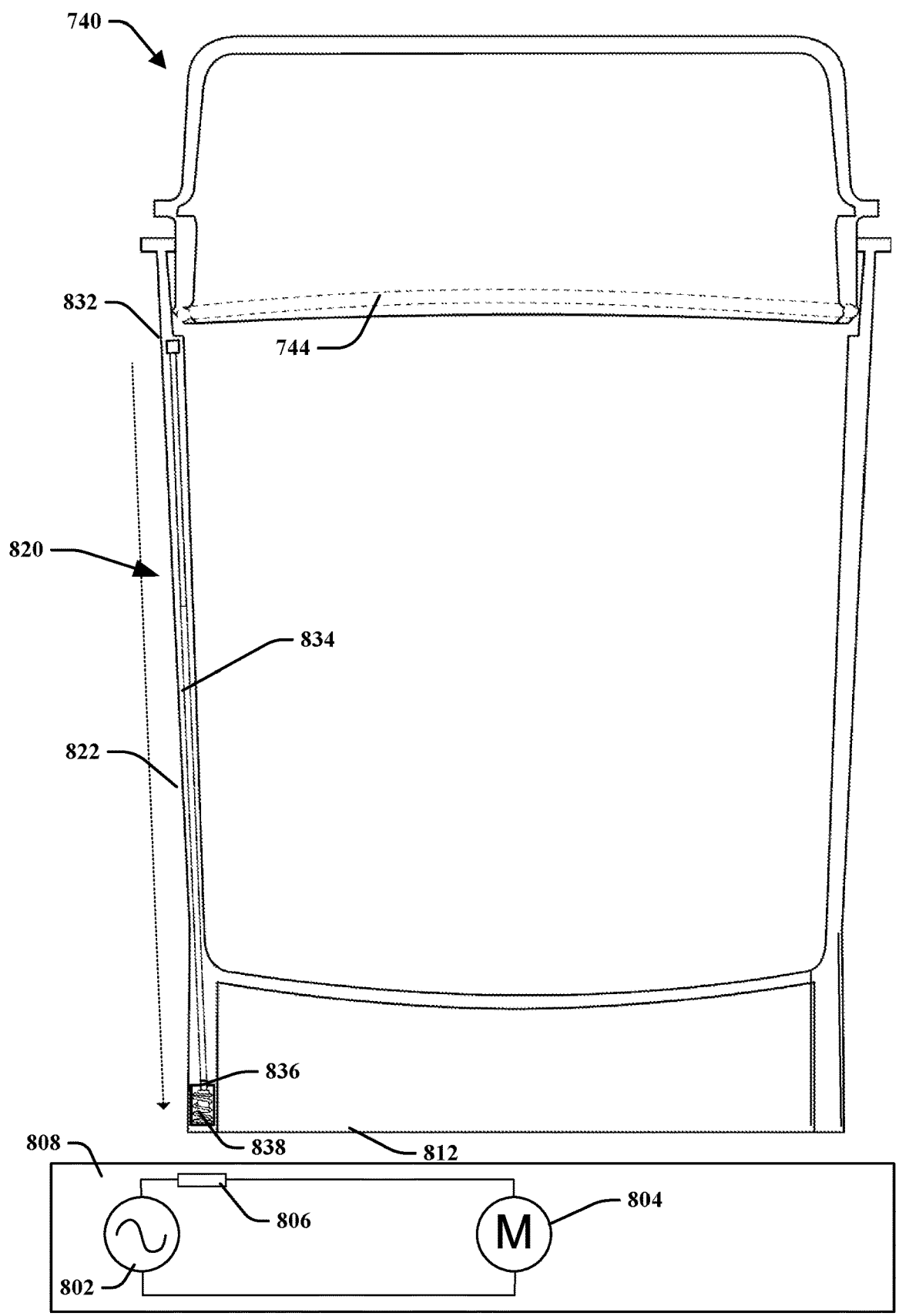
FIG. 8 is a partial cross-sectional, side view of a blending system including a container that operatively couples with a lid and a base, the container including one or more pushrods in accordance with the present disclosure.

Referring now to FIG. 8, illustrated are lid 740 and a container 810 that may be utilized by an interlocking blending system in accordance with one or more disclosed aspects. For instance, container 810 may be coupled with a blender base 808 that may house a motor 804. The motor 804 may be selectively powered by a power source 802 based on the connection state of lid 740, container 810, and base 808 (e.g., non-interlocked state 102 and an interlocked state 104.)

Container 820 may comprise side walls 820. Sidewall 820 may comprise a passage 822 that may include a push rod 834. The push rod 834 may include one or more magnets (e.g., magnet 832, 836). In an aspect, push rod 834 may be biased away from a container bottom 812. For instance, a biasing member 838 (e.g., spring, or the like) may bias the push rod 834 away from bottom 812. It is noted that the biasing member 838 may be located in other positions, such as proximal magnet 832.

In an embodiment, container 820 operatively attaches or docks on base 808. If lid 740 is not attached to the container 820, a triggering member 744 may trigger or repel magnet 832. For example, triggering member 744 may be a magnetic band that comprises an opposite charge with respect to the magnet 832. Repelling the magnet 832 may displace push rod 834 and may provide enough force to overcome biasing member 838. Accordingly, magnet 836 may be in position to close reed switch 806, thereby complete a circuit and allowing motor 804 to receive power from power source 802. If the lid 740 is removed, the biasing member will displace magnet 836 away from bottom 812. This may open reed switch 806, which may prevent power flow to motor 804.

Figure 9:
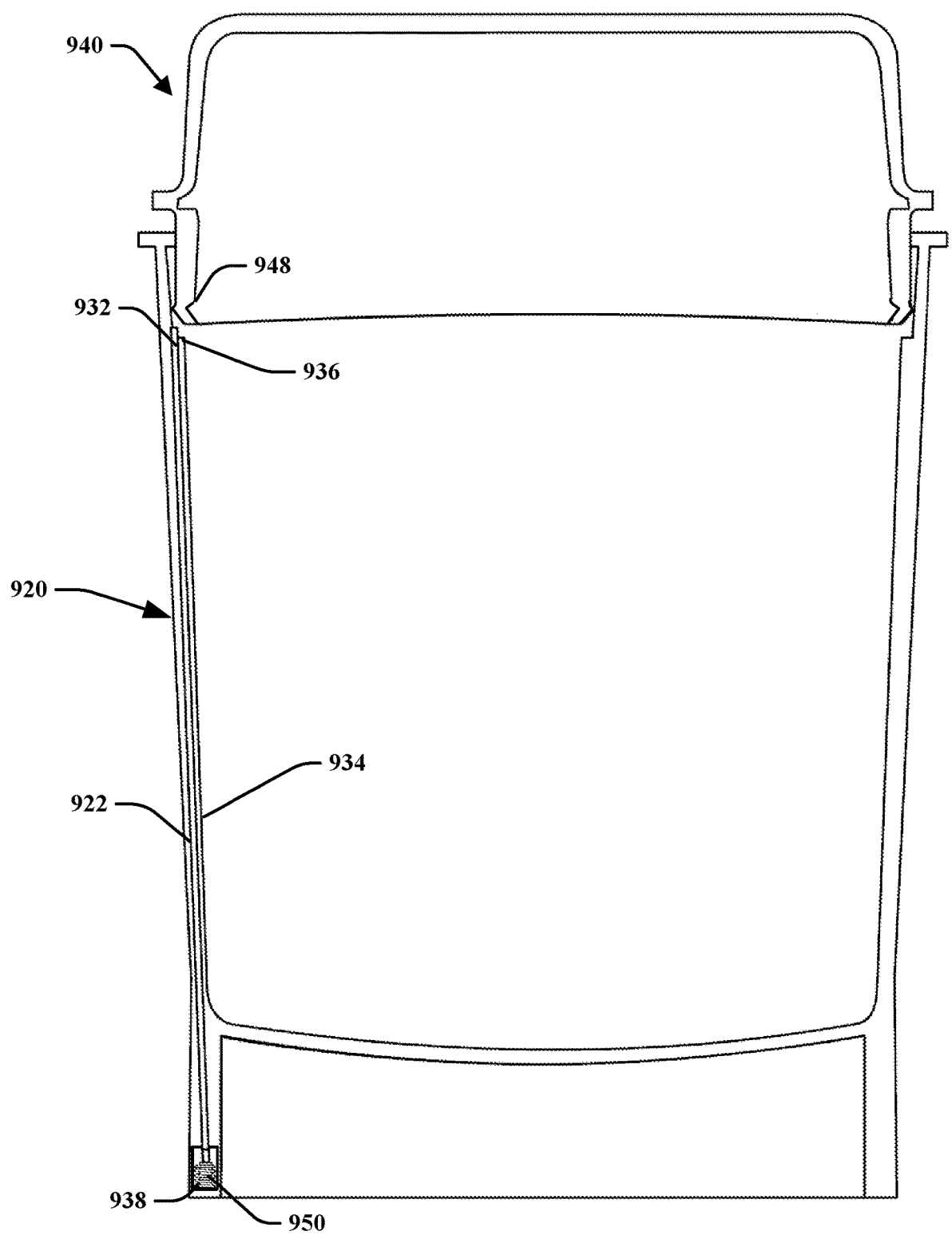
FIG. 9 is a partial cross-sectional, side view of a container that operatively couples with a lid, the lid physically actuating a pushrod of the container in accordance with the present disclosure.

It is noted that other embodiments may displace a pushrod via different means. For instance, FIG. 9 illustrates a container 910 that may comprise a pushrod 934. The pushrod 934 may be partially exposed at proximal end 936, near a flange or ledge 928 of container wall 920. Lid 940 may be configured to contact the proximal end 936. For instance, a bottom rim 948 of lid 940 may operatively contact or abut ledge 928 when a user pushes or otherwise affixes lid 940 to the container 920. The ledge 928 may act as a stop that prevents the user from pushing the lid 940 further into the container 940 than desired. As illustrated, the proximal end 936 of the pushrod 934 may extend from the ledge 932 such that the bottom rim 948 displaces the pushrod 934 when the lid 940 is attached to the container 920. If the user removes the lid 940, then the pushrod 932 may return to the non-depressed position.

In at least one embodiment, the downward force from a lid 940 may press the pushrod 934 to overcome a biasing member 938. This may allow a distal end 952 of the pushrod 934 to be exposed (e.g., activating a switch of a blender base—not shown) and/or translated towards a blender base (e.g., as described with reference to FIG. 8. In an example, a distal end 950 of pushrod 934 may comprise a magnet or other actuator portion that may actuate a switch on a blender base. It is noted that the switch may be a reed switch, manual or push switch (e.g., distal end 950 may extend from container 920 to manually push the switch), a metal contact, or other component as described herein.

Figure 10:
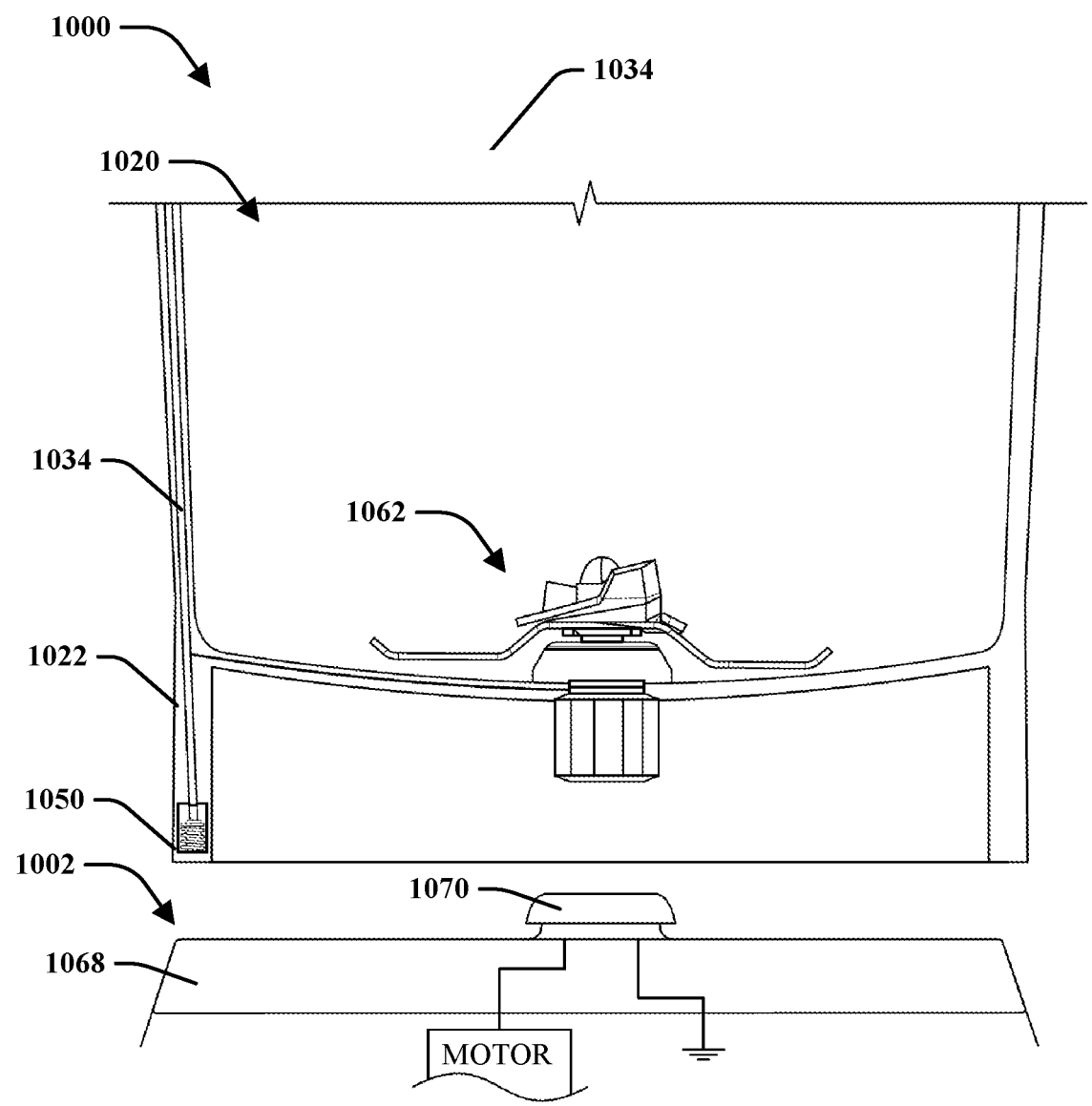
FIG. 10 is a partial cross-sectional, side view of a blending system including a container that operatively couples with a base, the container including a connection line that electrically couples to a blade assembly in accordance with the present disclosure.
Figure 11:
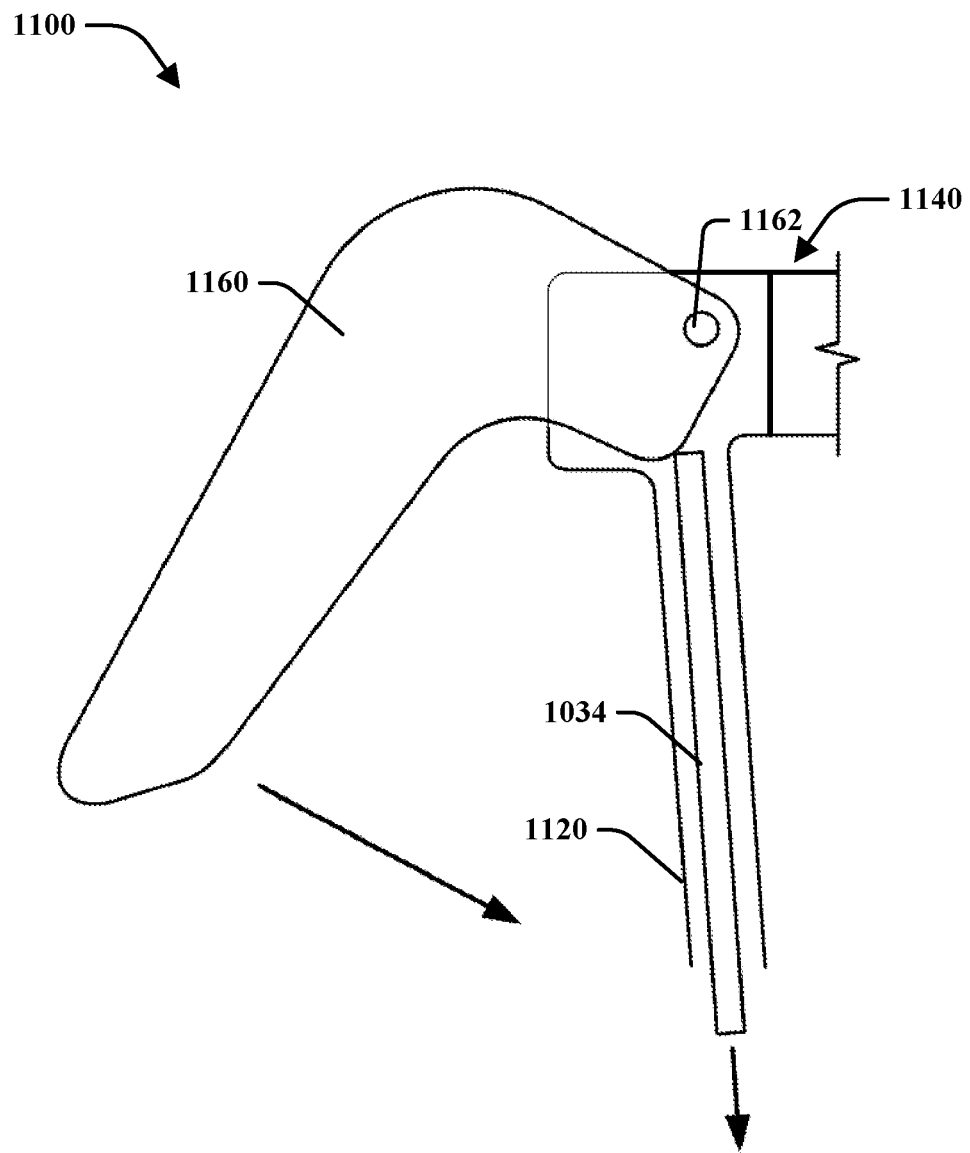
FIG. 11 is a partial cross-sectional, side view of a container and a lid including a handle that actuates a pushrod in accordance with the present disclosure.

FIG. 10 illustrates an embodiment of a blending system 1000 that may utilize a mechanical pushrod to ground a circuit and interlock the blending system 1000. The blending system 1000 may include a container 1020, a blender base 1002, and a lid (e.g., lid 640, 740, 940, etc.). Container 1020 may comprise similar aspects as described with reference to FIGS. 8-9. For instance, container 1020 may include a pushrod 1034 disposed within a passage 1022. A triggering member or actuator (not shown) may comprise a magnet, mechanical system, or the like that may displace pushrod 1034, as described herein. For instance, a lid (e.g., lid 940, etc.) may comprise a camming surface (not shown) with a tab (not shown) that allows a user to align the tab with the pushrod 1034, which may displace the pushrod 1034. In another example, as shown in FIG. 11, a lid 1140 may include a handle 1160 that may be hingedly secured (e.g., via hinge 1062) thereto. When a user places the lid 1140 on the container 1120 (which may comprise similar aspects to container 1020), the user may apply force to swing or push the handle 1060 towards the container 1120, such that the handle forces the pushrod 1034 downwards.

According to an embodiment, pushrod 1034 may act similar to a switch to selectively complete a circuit. The circuit may include a connection line 1060 (eclectically coupled to pushrod 1034), a blade assembly 1062 (electrically coupled to connection line 1060), a splined coupling 1064, a contact plate 1068, and/or other circuitry (e.g., splined drive 1070 and ground 1072). Splined drive 1070 may include a motor (not shown) that selectively drives splined coupling 1064. In an aspect, splined drive 1070 will disable operation of the motor when the circuit is not complete and may enable operation when the circuit is complete.

To complete the circuit, container 1020 is attached or otherwise docked on blender base 1002. And a distal end 1050 of pushrod 1034 must contact the contact plate 1068 to ground the circuit. Distal end 1050 will contact the contact plate 1068 if the lid (not shown) is attached to container 1020 such that the pushrod 1034 translates towards the contact plate. In an example, splined drive 1070 may apply a voltage to the splined coupling 1064. The splined coupling 1074 may apply the voltage to the blade assembly 1062, which may supply the voltage to pushrod 1034. When the lid is attached, the distal end 1050 makes contact with contact plate 1068; when the lid is removed, the distal end 1050 brakes contact with the contact plate.

Turning now to FIGS. 12-14, depicted is a blending system 1200 that may detect in interlocked state based on a detection system detecting a change in inductance of a sensing coil. The blending system 1200 may selectively allow operation of the motor based on the interlocked state. It is noted that system 1200 may include similar aspects as the various other systems described herein.

Blending system 1200 may primarily include base 1210, container 1220, and lid 1240. Lid 1240 may operatively attach to container 1220, and container 1220 may operatively attach to base 1210. For instance, base 1210 may include a pedestal 1250. The pedestal 1250 may include one or more posts or protrusions 1252. Container 1220 may include an apron 1256 sized and shaped to mate with pedestal 1250. For instance, apron 1256 may include one or more corners or flanges 1258 that may mate with protrusions 1252.

In another aspect, pedestal 1250 may include one or more sensing coils 1212. The sensing coil 1212 may be disposed within a ridge 1214 of pedestal 1250. While FIGS. 12-13 illustrate ridge 1214 as passing through or intersecting with protrusions 1252, it is noted that ridge may be disposed underneath, around, internal to, or otherwise proximal protrusions 1252. In another aspect, pedestal 1250 may not comprise any protrusions. It is further noted that the sensing coil 1212 may be comprised within a housing of the blender base 1210 or another housing, which may prevent exposure to liquids, foodstuff, or the like.

Lid 1240 may comprise a body 1242 that may include one or more triggering members 1244. The triggering member 1244 may include a magnetic band, one or more magnets, tabs, protrusions, inductive coils, or the like. In at least one embodiment, the triggering member 1244 may be comprised by other components of blender system 1200, such as a tab or clip 1246 of lid 1240, a handle, or the like. It is noted that the type of triggering member 1244 may depend, at least in part, on a type of switch or sensor 1234 utilized in the system. For instance, a reed switch or other sensor responsive to a magnet may be utilized with magnetic bans. A reed switch, as an example, may close in response to application of a magnetic field, and may open in response to removal of the magnetic field.

Container 1220 may include connection lines 1226 (e.g., wires, a flexible circuit board, etc.) coupled to the sensor 1234. In an aspect, a flexible circuit board may allow for altered (e.g., improved, less expensive, easier, etc.) assembly. In another aspect, the flexible circuit may provide a more aesthetic appeal for containers having transparent or opaque bodies.

Figure 15A:
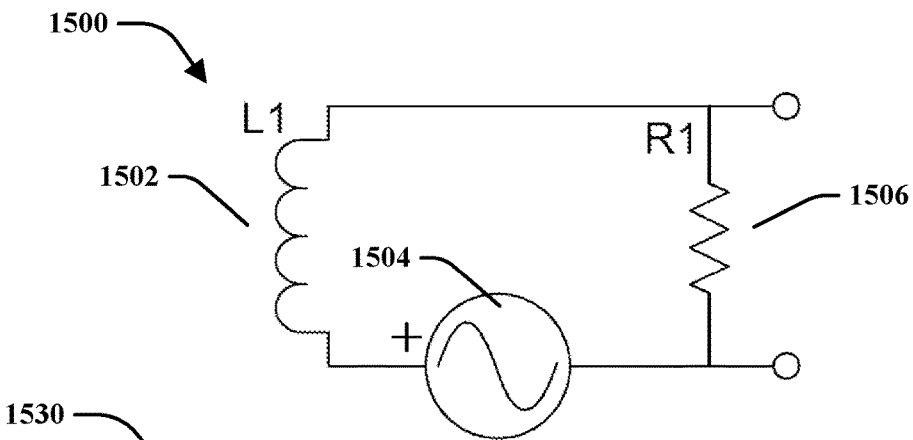
FIG. 15A is an exemplary circuit diagram of an RL circuit that operatively measures reactance of a blending system in accordance with the present disclosure.
Figure 15B:
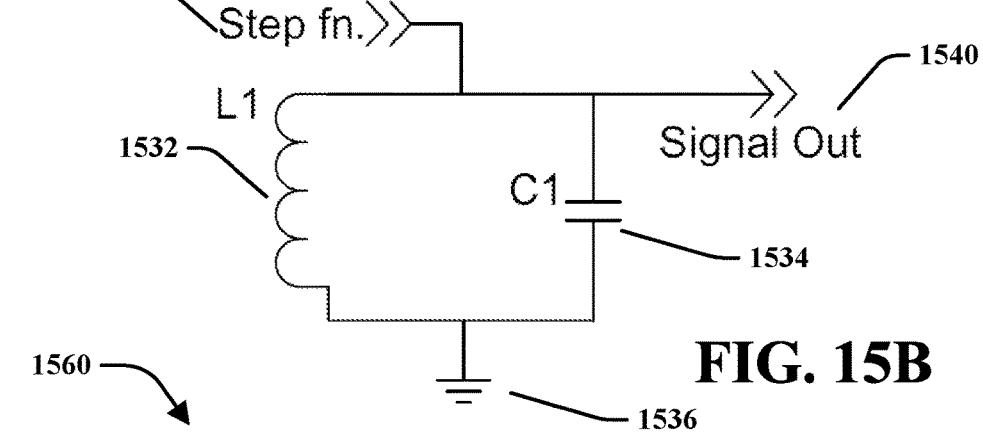
FIG. 15B is an exemplary circuit diagram of an LC circuit that operatively measures properties of a blending system in accordance with the present disclosure.
Figure 15C:
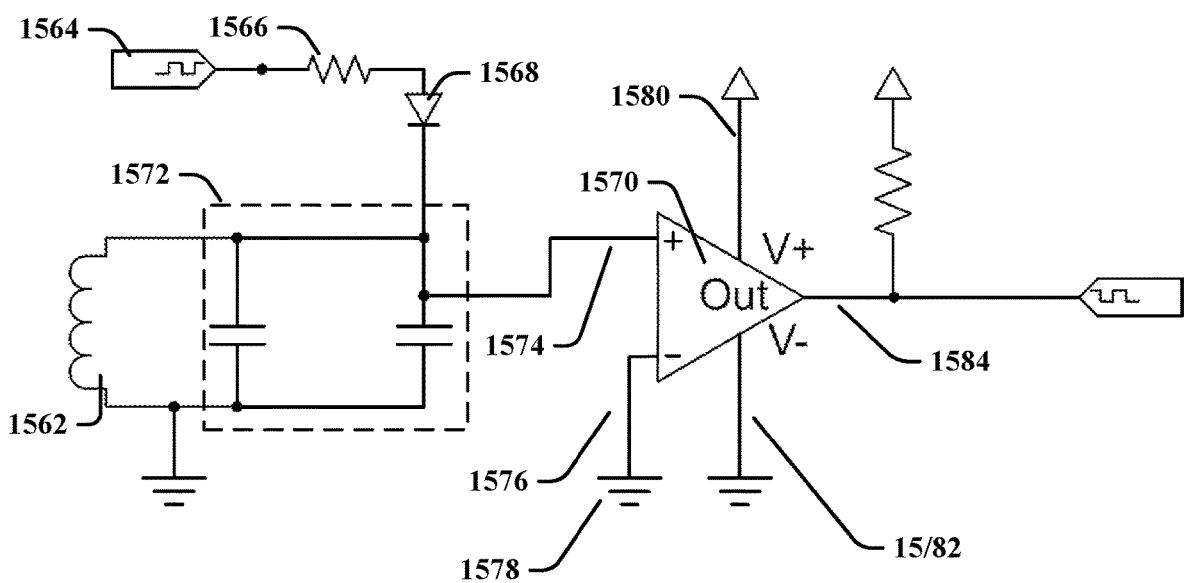
FIG. 15C is an exemplary circuit diagram of a resonating LC circuit that may include an inductive coil and one or more capacitors in series in accordance with the present disclosure.

FIGS. 15A-15C are circuit diagrams representing portions of a blending system. FIG. 15A illustrates an RL circuit 1500 that may be utilized to measure reactance of a blending system (e.g., blending system 1200). For instance, the reactance of an inductive coil 1502 (e.g., sensing coil 1212) may be altered based on the presence of other inductive coils and/or circuitry. As shown in FIGS. 12-14, when a container 1220 and lid 1240 are connected to base 1210, the inductance of the sensing coil 1212 is altered from a first value to a second value. Further, if container 1220 is attached to base 1210 without lid 1240, the inductance may be altered to a third value. It is noted that blending system 1200 may determine inductance through measuring current, voltage, or other parameters of blending system 1200.

For instance, RL circuit 1500 may include a coil (L1) 1502, which may be a sensing coil 1212. The coil may be excited with a signal (e.g., AC signal) from a power source 1504. A voltage (V) across a known resister (R1) 1506 will yield current (I) multiplied by a complex impedance (Z), which may be equal to the resistance (R) of the resister plus the angular frequency (ω) multiplied by the inductance (L) of coil L1. For instance:

$$V=IZ;$$

$$Z=R+j*\omega L;$$

where j is the imaginary unit. Since V, I, R, and ω are all known, L may be determined. A blending system may selectively allow or deny operation of a motor based on the value of L. For instance, a known voltage may be applied to the RL circuit 1500, a current may be measured, and the resistance may be known. The system may then determine the inductance. It is noted that systems may compare a value of L to values stored in memory or the like.

In other embodiments, blending systems may utilize a circuit without a restore. For example, sensing coil 1212 may be connected to a power supply and a current measuring circuit. A container may include an inductive coil and a circuit loop with one or more switches. When a lid is connected to the container, the one or more switches may close. Closing the switches may complete the loop and thereby alter the current measured by the current measuring circuit. Blending systems may selectively allow the motor to power on based on the level of current.

FIG. 15B is an LC circuit 1530 that may be utilized to measure a resonant frequency of components of a blender system (e.g., blending system 2500, etc.). The LC circuit 1530 may include an inductor 1532, a capacitor 1534, a ground 1536, a step-function input 1538, and a signal output 1540. In an example, step-function input 1538 may alter the resonant frequency of the LC circuit 1530. Values of the resonant frequency may be associated with whether the lid, container and/or base are connected. In an example, an inductance (L) may be a function of a resonant frequency (f), capacitance (C) and a constant, such as:

$$L = \frac{1}{4Cf^2\pi^2}.$$

As components of a blending system are attached to the blender base, the circuitry in the components may alter the resonant frequency. Since inductive reactance magnitude increases as frequency increases while capacitive reactance magnitude decreases with the increase in frequency, the system may determine the status of the lid and/or container. Based on the status, the system may selectively allow operation of a motor.

FIG. 15C is a resonating LC circuit 1560 that may include an inductive coil and one or more capacitors in series 1572. The resonating LC circuit 1560 may be utilized to determine an unknown inductance across the coil 1562 (e.g., sensing coil 1212). An input wave 1564 may be applied across a resistor 1566 and to a diode 1568. A comparator 1570 may receive a non-inverting input 1574 from the series 1572 and an inverting input 1576 to ground 1578. The comparator 1570 may be connected to a positive power supply 1580 and a negative power supply 1582. The output 1584 of the comparator 1570 may be utilized to determine the inductance of the coil 1562. Blender systems may determine the interlocked states based on the inductance, and may selectively power a motor.

Figure 16:
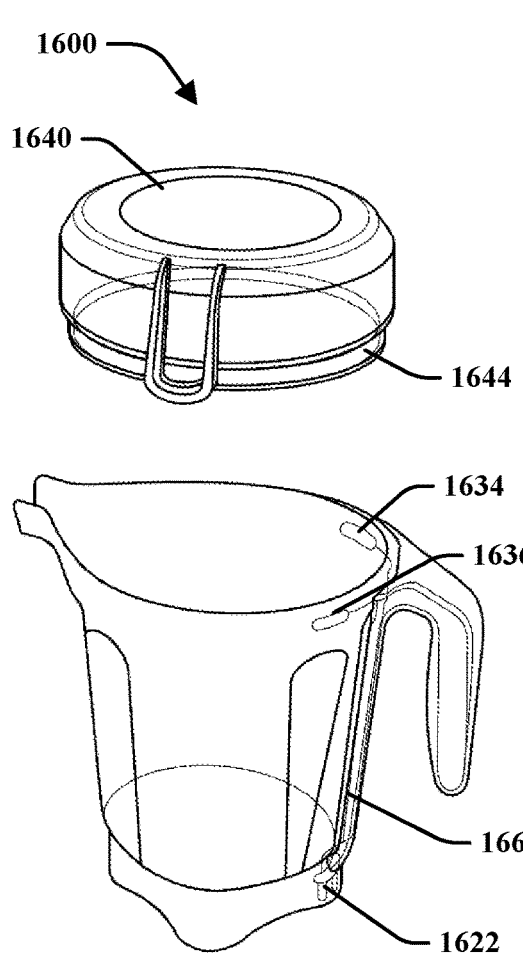
FIG. 16 is an exploded, prospective view of a lid and a container of a blending system, the container including one or more contact pins in accordance with the present disclosure.
Figure 17:
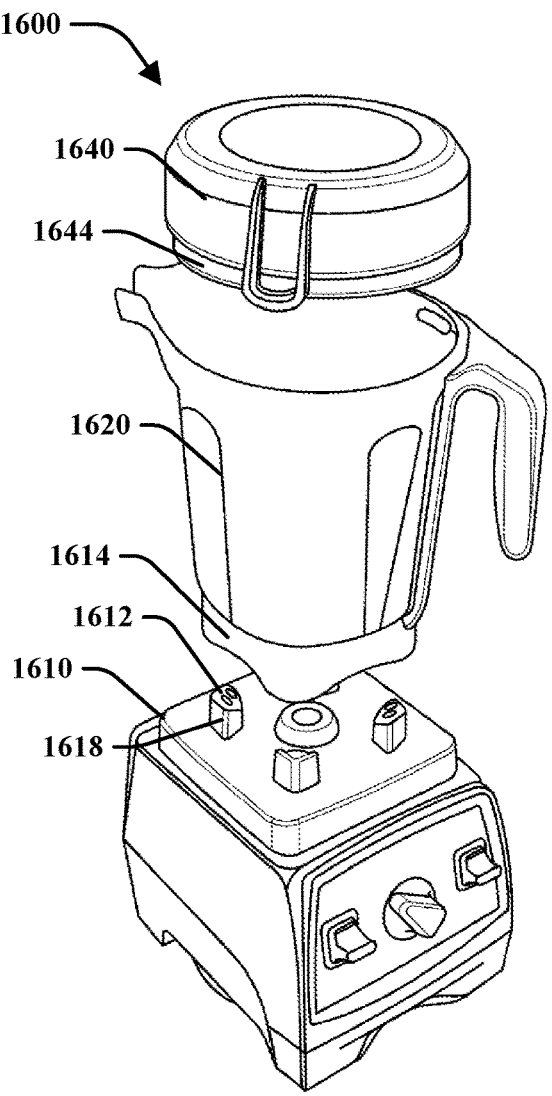
FIG. 17 is an exploded, prospective view of the blending system of FIG. 16 in accordance with the present disclosure.
Figure 18:
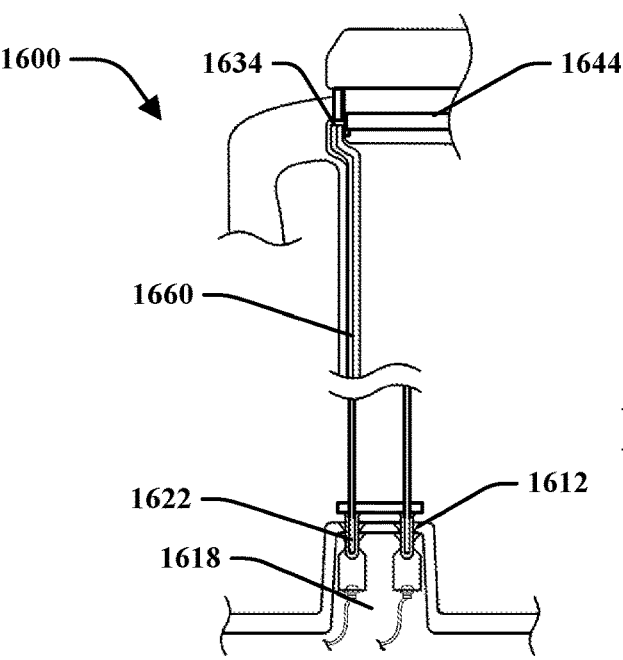
FIG. 18 is a partial cross-sectional, side view of the blending system of FIG. 14 illustrating a connection between the container and a base in accordance with the present disclosure.

Turning to FIGS. 16-18, there is an interlocking blending system 1600 that selectively operates a blender motor utilizing a conductive lid. Blending system 1600 may primarily include a base 1610, a container 1620, and a lid 1640. It is noted that components of blending system 1600 may include aspects described with reference to the various disclosed embodiments.

Lid 1640 may include triggering member 1644 which may interact with one or more sensors 1634 of container 1620. In an example, the triggering member 1644 may comprise a conductive band and sensors (e.g., contact pads 1634, 1636). When lid 1640 is operatively attached to container 1620, an electrical signal may pass from a first contact pad 1634 to a second contact pad 1636. While described as a conductive band, it is noted that the lid 1640 may comprise different conductive members, such as one or more crescent or "C" shaped conductive strips, or the like. In another aspect, the lid 1640 may comprise a conductive coating, conductive polymers (e.g., intrinsically conducting polymers), or the like. It is noted that conductive materials may comprise food-grade conductive materials.

Contact pads 1634, 1636 may be coupled with one or more connection lines 1660 (e.g., wires, printed circuit board, flexible circuit board, etc.). The connection lines 1660 may extend through the container 1620 to contact pins 1622. In an aspect, the contact pins 1622 may comprise a plug, prongs, or the like. In another aspect, the contact pins 1622 may be sized and shaped to be received by one or more outlets 1612 of base 1610. For instance, contact pins 1622 may be disposed within apron 1614. Base 1610 may include a pedestal 1616 that may be sized and shaped to receive container 1620. When container 1620 and base 1610 are operatively attached, the contact pins 1622 may align with at least one outlet 1612. Outlets 1612 may be disposed within one or more protrusions 1618. It is noted blending system 1600 may comprise one or more outlets (e.g., 1, 2, 3, 4, etc.). In an aspect, two or more outlets may allow container 1620 to be attached to base 1610 in two or more orientations.

As described in accordance with various disclosed embodiments, blending system 1600 may allow operation of a motor (not shown) when the lid 1640 bridges the contact pads 1634, 1636, and when the container is operatively attached to the base 1610. If at any time, the lid 1640 and/or container 1620 are removed or otherwise break the flow of an electrical signal, the blending system 1600 may stop the motor and/or prevent operation of the motor and/or rotation of the blades.

While blending system 1600 is described as comprising contact pins, pads and/or plugs, it is noted that various other configurations are considered within the scope and spirit of this disclosure. For instance, container 1620 may comprise a spring contact configured to friction-fit or press fit within a contact plug. In another example, container 1620 may comprise contact pads configured to contact pads of base 1620, wherein force from the weight of the container may press or wedge the pads together. In another example, container 1620 may comprise a plurality of contacts disposed at one or more positions. For instance, container 1620 may comprise two contacts disposed generally opposite each other, and base 1610 may comprise contacts configured to interact with the contacts of container 1620, or vice-versa.

Figure 19:
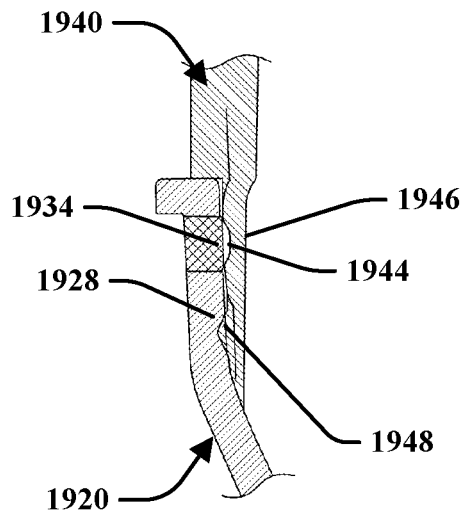
FIG. 19 is a partial cross-sectional, side view of the blending system including a flexible lid that operatively attaches or engages a container in accordance with the present disclosure.

FIG. 19 illustrates an exemplary lid-container contact arrangement where a lid 1940 comprises a flexible portion 1946. The flexible portion 1946 may comprise one or more tabs, recesses, or other lid formations 1948. The lid formations 1948 may be configured to match and/or mate with tabs, recesses, or other container formations 1928 of container 1920. For example, a user may align lid 1940 with container 1920. The user may press downward or otherwise apply force to the lid 1940. The flexible portion 1946 of lid 1940 may bend, flex, or otherwise deform as the user presses the lid into place. When in a desired location, the lid formations 1948 may mate with the container formations 1928, as illustrated. In an aspect, container 1920 may include a contact 1934, which may be similar to other contacts described with reference to the various other figures. The lid 1940 may comprise a conductive portion 1944 (e.g., a conductive band, triggering member 1644, etc.) that may operatively, electrically couple with contact 1934 when the lid 1940 is attached to the container 1920.

Figure 20:
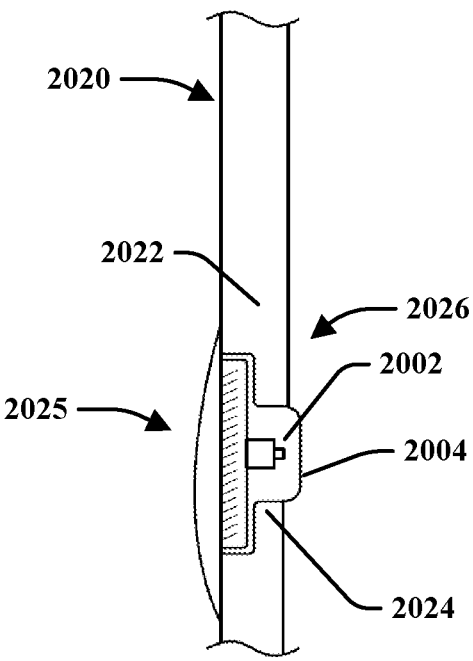
FIG. 20 is a partial cross-sectional, side view of the blending system including a container comprising a sealed switch in accordance with the present disclosure.
Figure 21:
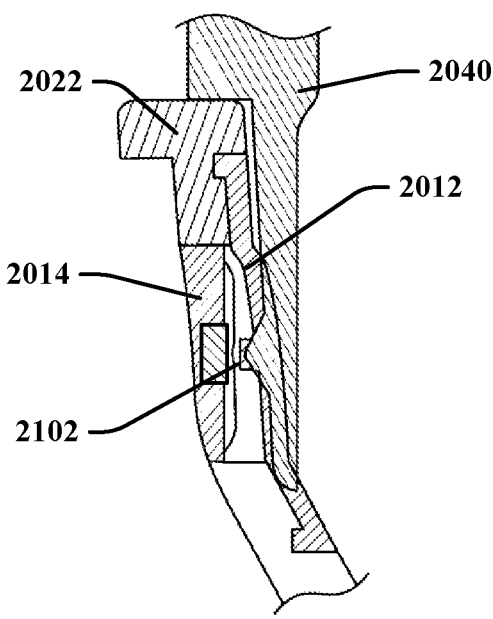
FIG. 21 is a partial cross-sectional, side view of the blending system including a container comprising a sealed switch and a lid that operatively actuates the sealed switch in accordance with the present disclosure.

FIGS. 20-21 illustrate exemplary embodiments of interlocking blending systems comprising a mechanical switch disposed in or on a container wall. It is noted that a switch may include various types of switches, such as miniature button switches, finger switches, dome switches, or the like. It is further noted that a switch may be disposed on a container lip, wall, ledge, or the like. For instance, the placement and orientation of the switch may vary depending on a desired configuration. In an example, a switch may be oriented such that a movable portion translates a vertical axis, horizontal axis, or a diagonal. In another aspect, described switches may be connected to other components as described with reference to the various disclosed embodiments.

Turning to FIG. 20, illustrated is a switch 2002 disposed on a container wall 2022 of a container 2020. The blender wall 2022 may comprise an aperture 2024 configured to receive the switch 2002 (e.g., which may comprise a movable portion 2008 and a circuit board 2010). In an aspect, a boot 2004 or seal may be positioned within the aperture 2024. The switch 2002 may be inserted to sandwich the boot 2004 between the switch 2002 and the container wall 2022. The switch 2002 may be overmolded on a first side 2025 (e.g., external side) of container wall 2022. Overmolding will create pressure on the switch 2002, which may compress and/or apply pressure to the boot 2004. This may create an impervious seal. In an aspect, the boot 2004 may comprise a flexible material that may be exposed on a second side 2026 (e.g., internal side) of the container wall 2022. When a lid 2040 is attached to the container 2020, a protrusion or tab 2044 of the lid 2040 may press or actuate the movable portion 2008 of the switch 2002.

In another aspect, a switch may be mounted into the container wall 2022, and hermetically sealed from the electrolyte presence possible inside the container 2020. The switch may be mounted from the exterior of the container and may be sealed or covered with one or more caps or plugs (e.g., shown as plugs 2012, 2014 in FIG. 21). According to an embodiment, a switch may be insert-molded into the container wall 2022 without external mounting.

Figure 22:
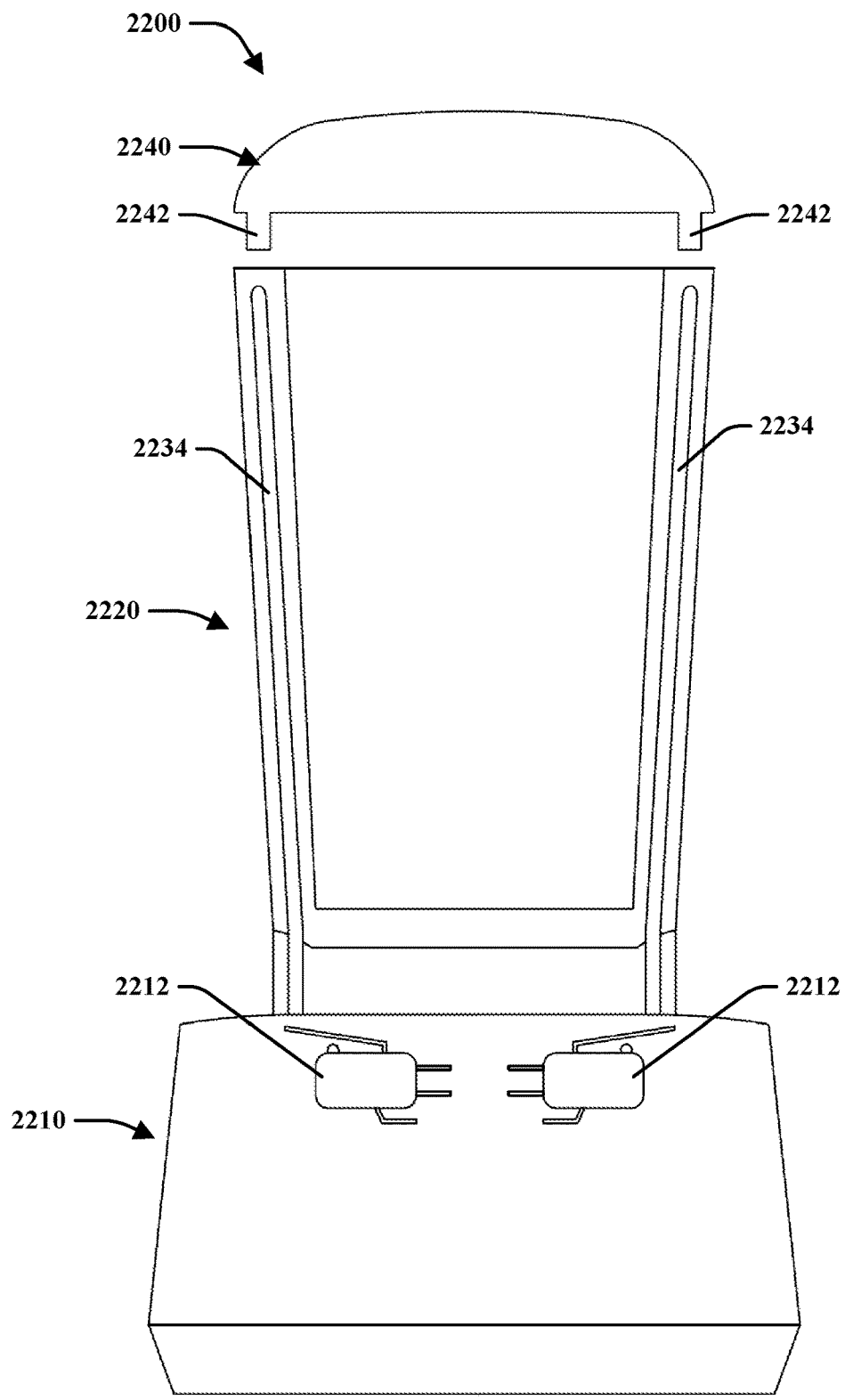
FIG. 22 is a partial cross-sectional, side view of the blending system including one or more pushrods in accordance with the present disclosure.

FIG. 22 illustrates an embodiment with two or more (e.g., 2, 3, 4, etc.) pushrods 2234 disposed within a container 2220. A lid 2240 may comprise one or more actuators 2042 that may engage or actuate the pushrods 2234. In an aspect, the lid 2240 may have the same or a different number of actuators 2242 as the container 2220 has pushrods 2234. When lid 2040 is operatively attached to the container 2220, the actuators 2242 actuate the pushrods 2234 to actuate one or more switches 2212 within the base 2210. The switches 2212 may comprise various types of switches, such as leaf switches.

In an example, container 2220 comprises four pushrods 2234. The base 2010 may be configured to selectively allow power based on the number of actuated pushrods 2234. For instance, switches 2212 may determine which and/or how many pushrods 2234 are actuated by the lid 2240. In one embodiment, base 2210 requires actuation of all four pushrods 2234.

In another embodiment, certain container models may comprise different numbers of pushrods 2234. Base 2210 may determine the number of actuated pushrods 2234 to determine the type of container (e.g., single serving, large format, etc.). Based on the type of container, the base 2210 may selectively allow or deny availability of blender programs. For instance, certain blending programs may be available for large format blending containers and may not be available for single serving-style blending containers.

Figure 23:
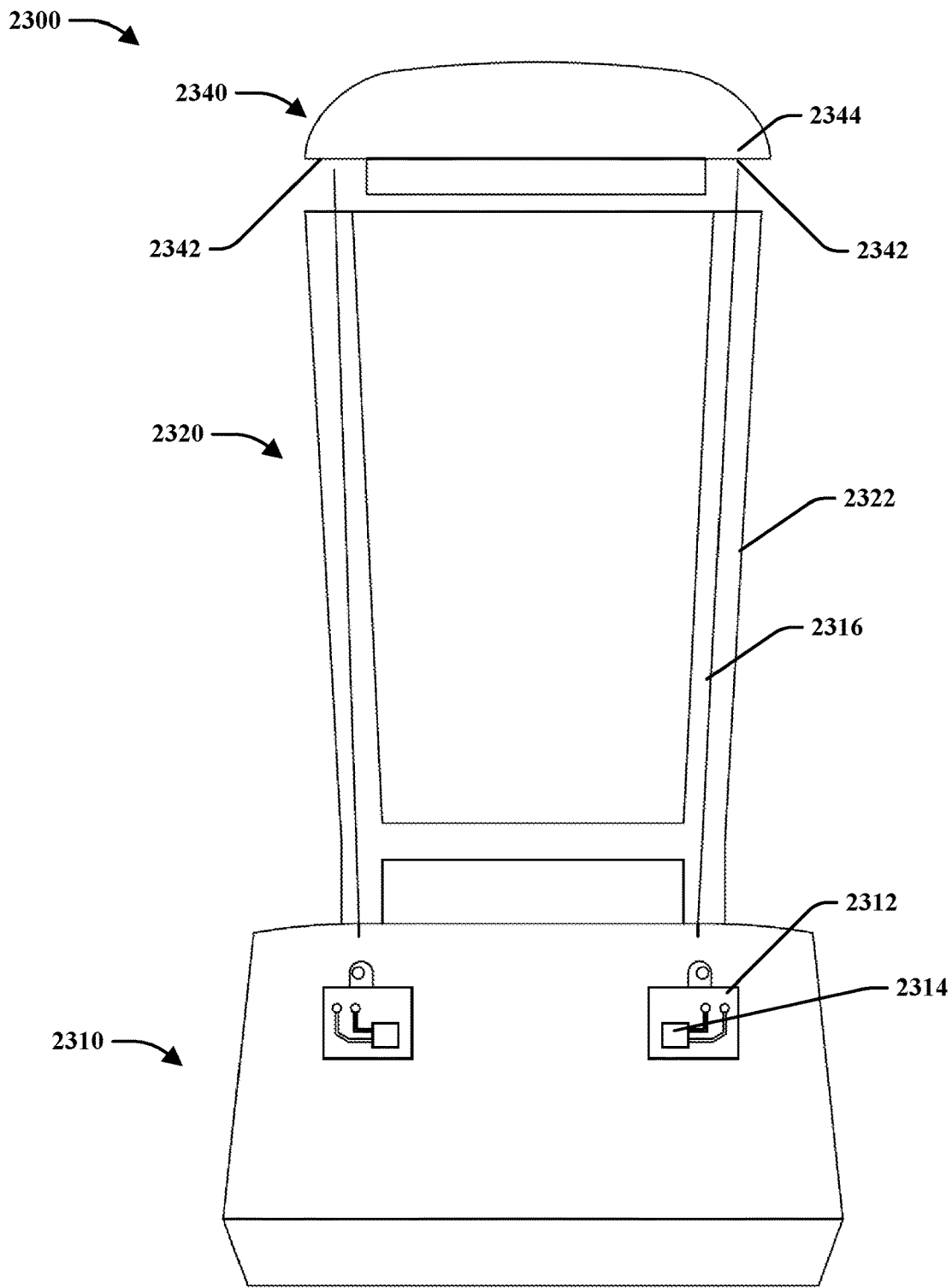
FIG. 23 is a partial cross-sectional, side view of the blending system including one or more light sensors in accordance with the present disclosure.

Turning to FIG. 23, there is an interlocking blending system 2300 that may determine whether components are interlocked based on one or more light sensors. For instance, blending system 2300 may primarily include a base 2310 (which may include one or more light sources 2312), a container 2320 (which may propagate light), and a lid 2340 (which may reflect light). It is noted that blending system 2300 may include different components and/or aspects described with reference to the various disclosed embodiments.

Base 2310 may generate a light 2316 (e.g., via light sources 2312). It is noted that base 2310 may include any number of light sources 2312. The light sources 2312 may generate an appropriate light at a desired intensity, wavelength, and the like. For instance, light sources 2312 may generate infrared (IR) light. In another aspect, base 2310 may comprise one or more light sensors 2314 that may detect or sense light. In an example, the light sensors 2314 may operatively detect light at wavelengths of the light emitted from light sources 2312 (e.g., IR light).

Container 2320 may be configured to propagate or otherwise allow the travel of light emitted from light sources 2312. In an embodiment, light may propagate through a container wall 2322 and/or through a light pipe (not shown). A light pipe or tube may include a generally hollow tube lined with a reflective coating, a solid tube that allows for internal reflection (e.g., optic fibers), or the like. It is noted that the light pipe may be comprised within the container wall 2322, on a surface (e.g., internal and/or external) container wall 2322, may be integrally formed with (e.g., may comprise a ridge or the like) or separately formed from the container wall 2322 (e.g., may comprise fiber optic cable that is removably or irremovably attached), or the like. For sake of brevity, examples may refer to light passing through container wall 2322. However, it is noted that embodiments may utilize light pipes or the like. In an embodiment, light sources 2312 may be configured to generate light in patterns, at intervals, while power is supplied to base 2310, upon a triggering event (e.g., user attempts to operate motor), or the like.

Lid 2340 may comprise a reflective surface 2342 disposed in a position to reflect light from light sources 2312 when attached to container 2320. For instance, lid 2340 may comprise reflective surface(s) 2342 disposed within, adhered to, or otherwise positioned on a lip 2344 of lid 2340. It is noted that the reflective surface 2342 may comprise a metal, glass, plastic, or other material.

In an interlocked state, light sources 2312 may be configured to generate a light signal through the container wall 2322. Light may be reflected by the attached lid 2340 via reflective surface 2342. The reflected light may be directed towards the light sensors 2314 (e.g., via container wall 2322). Blending system 2300 may be configured to detect the reflected light and determine that the base 2310, container 2320, and lid 2340 are interlocked. In another aspect, if light sensors 2314 do not detect the reflected light, then blending system 2300 may determine that the base 2310, container 2320, and lid 2340 are not interlocked.

Figure 24:
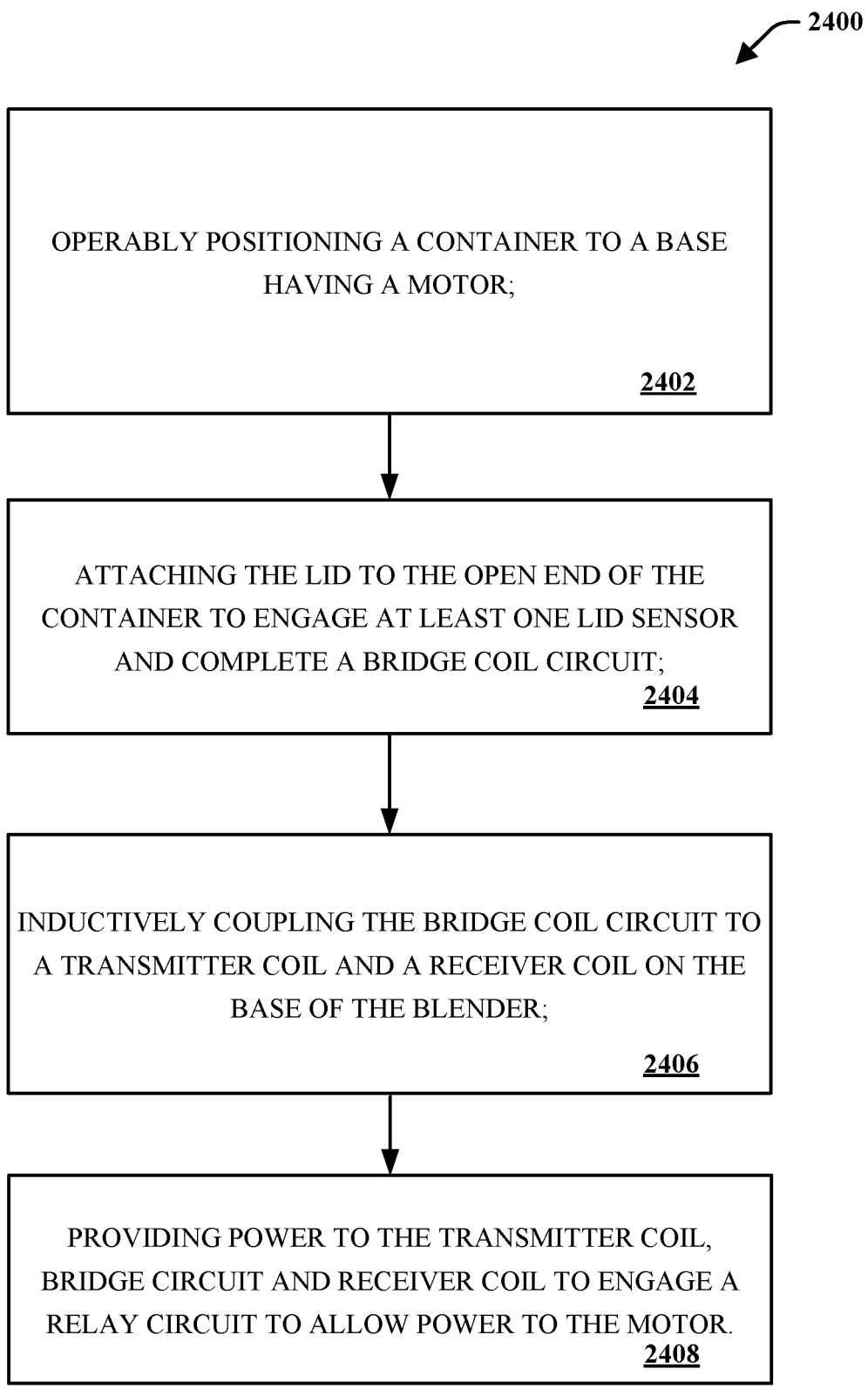
FIG. 24 is flowchart of a method for operating a blender in accordance with embodiments of the present disclosure.

In view of the subject matter described herein, a method that may be related to various embodiments may be better appreciated with reference to the flowcharts of FIG. 24. While method 2400 is shown and described as a series of blocks, it is noted that associated method or process is not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

In another example, a container may include one or more switches that close in response to attaching a lid to the container (e.g., reed switches), and one or more switches that close in response to attaching the container to a base. When all switches are closed, the base may supply power to or otherwise operate a motor. When less than all switches are closed, the base may prevent operation of the motor. It is noted that aspects of the described embodiments may be altered and combined in various configurations without departing from the scope and spirit of the subject disclosure.

FIG. 24 is a method that provides for safely operating a blender system based on whether the system is interlocked. At reference 2402, a user may operably position a container to a base having a motor. A lid is attached to an open end of the container to engage at least one lid sensor and complete a bridge coil circuit. At 2404, a bridge coil circuit is inductively coupled to a transmitter coil and a receiver coil on the base of the blender. At 2406, the transmitter coil, bridge circuit and receiver coil are powered to engage a switch device or relay circuit to allow power to the motor of the blender. At 2408, power may be provided to the transmitter coil, bridge circuit and receiver coil to engage a relay circuit to allow power to the motor.

Figure 25:
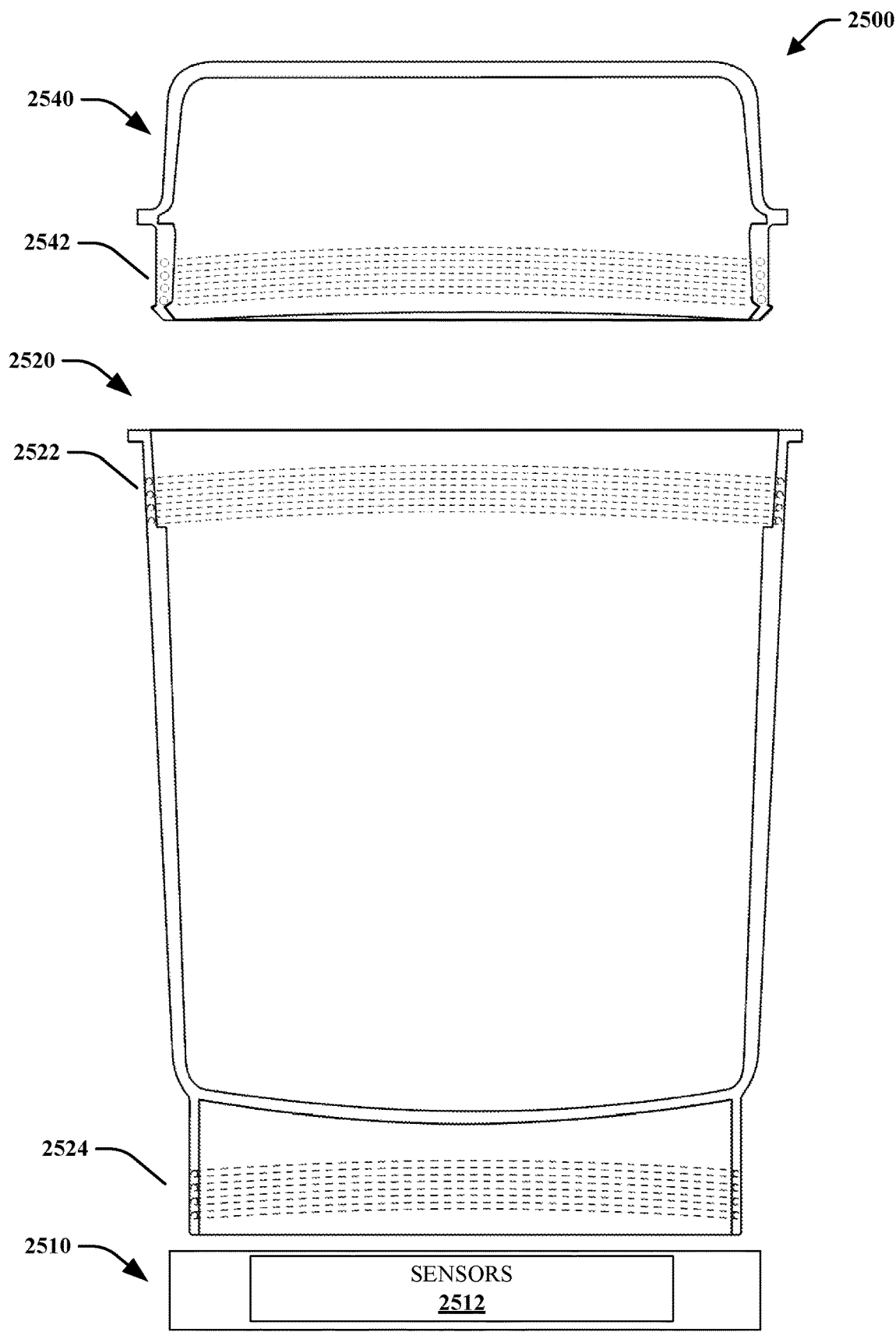
FIG. 25 is a partial cross-sectional, side view of the blending system that may detect properties of one or more inductive coils in accordance with the present disclosure.

FIG. 25 is an interlocking blending system 2500 that may determine whether components are interlocked based on comparative changes in inductance or other properties of circuitry. For instance, blending system 2500 may primarily include a base 2510 (which may include one or more sensors), a container 2520, and a lid 2540. It is noted that blending system 2500 may include different components and/or aspects described with reference to the various disclosed embodiments.

In an embodiment, lid 2540 may comprise one or more coils 2542 disposed in a body 2544. Container 2520 may comprise one or more sets of coils (e.g., first set 2522 and/or second set 2524). For instance, first set 2522 may be disposed proximal an open end 2526 and the second set 2524 may be disposed proximal a closed end 2528. Base 2510 may include one or more sensors 2512 that operatively sense properties of the one or more sets of coils, such as resonance frequency or current. In an example, if a user attaches the container 2520 to base 2510 without the lid 2540, the sensors 2512 may detect the properties of first set 2522 and/or second set 2524. If the user attaches the lid 2540, the properties of the first set 2522 and/or second set 2524 change due to the coils 2542 of the lid. Sensors 2512 may detect the properties and may selectively allow power to a motor, thereby selectively allowing operation of a blade assembly.

It is noted that the lid 2540, container 2520, and/or base 2510 may utilize various disclosed aspects. For instance, lid 2540 may alternatively or additionally include one or more magnets, container 2520 may alternatively or additionally include one or more switches, or the like. As such, aspects of this disclosure may be selectively arranged in any desired combination.

In at least one embodiment, various described blending systems may include a computer readable memory device and a computer processor. The memory device may be configured for storing computer executable instructions. The processor may execute the instructions to perform tasks or operations. The processor may execute instructions to determine the state or interlocked status of the blending system. For instance, the processor may determine whether a container is attached, whether a lid is attached, whether the container and lid are attached, and the like. It is noted that the processor may execute instructions to generate notifications or status information to users via an interface device, such as a display screen, LED, speaker, or the like. In another example, the processor may initiate transmission of the status information via a communications network.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Furthermore, it is noted that the various embodiments may be altered, combined, or arranged in any desired configuration. For instance, different lids, containers, bases, switches, circuitry, or the like may be utilized in different combinations than illustrated. Accordingly, the present specification is intended to embrace all such alterations, modifications and variations that fall within the spirit and scope of the appended claims. To the extent that the term "includes" is used in either the detailed description or the claims, such term is intended to be inclusive in a manner similar to the term "comprising" as "comprising" is interpreted when employed as a transitional word in a claim.

What is claimed is:

1. An interlocking blending system comprising:
a base comprising a motor, a switch, a first set of inductive coils, and a sensor that monitors change in an electrical property of the first set of coils; and
a container comprising a blade assembly and a second set of inductive coils, wherein the second set of inductive coils inductively couples with the first set of inductive coils when the second set of inductive coils are operatively positioned on top of the first set of inductive coils;
wherein the base permits operation of the blade assembly based on the inductive coupling of the first set of coils and the second set of coils when the container is operatively positioned on top of the base, which causes the switch to be in closed state completing a power circuit to drive the blade assembly.

2. The blending system of claim 1, wherein the first set of inductive coils includes a transmitter coil and a receiving coil and wherein the second set of inductive coils includes a transmitter coil and a receiving coil.

3. The blending system of claim 2, wherein the transmitter coil of the first set of inductive coils induces current in the receiving coil of the second set of inductive coils in response to power supplied to the transmitter coil of the first set of inductive coils when the container is operatively attached to the base.

4. The blending system of claim 1, wherein the base determines whether the container is attached to the base based on the monitored change in the electrical property.

5. The blending system of claim 4, further comprising a lid, wherein at least one of the lid or the container alter the electrical property of the first set of coils when the lid is operatively connected with the container and the container operatively coupled to the base.

6. An interlocking blending system comprising:
a base including a motor, a display and a first set of inductive coils; and
a container including a second set of inductive coils that inductively couples with the first set of inductive coils when the second set of inductive coils are operatively positioned on top of the first set of inductive coils;
wherein the base comprises a sensor that monitors change in an electrical property of the first set of coils and a switch that: i) permits operation of the motor based on the inductive coupling of the first set of coils and the second set of coils when the container is operatively positioned on top of the base and ii) prevents operation of the motor based on the container not being operatively positioned on top of the base but permits operation of the display.

7. The interlocking blending system of claim 6, wherein the base generates a status indicator displayed on the display.

8. The interlocking blending system of claim 7, wherein the status indicator provides information to a user to indicate whether the base and the container are disconnected.

9. The interlocking blending system of claim 6, wherein the first set of inductive coils includes at least one transmitter coil and at least one receiving coil and the second set of inductive coils includes at least one transmitter coil and at least one receiving coil, and wherein the at least one transmitter coil of the first set of inductive coils induces current in the at least one receiving coil of the second set of inductive coils in response to power supplied to the at least one transmitter coil of the first set of inductive coils when the container is operatively attached to the base and wherein the switch moves to a closed position.

10. An interlocking blending system comprising:
a base including a motor, a contact plate and a first set of inductive coils; and
a container including a pushrod and a second set of inductive coils, the second set of inductive coils selectively inductively couples with the first set of inductive coils when the second set of inductive coils are operatively positioned on top of the first set of inductive coils;
wherein the pushrod translates towards and makes contact with the contact plate to permit operation of the motor when a lid is attached, and the pushrod breaks contact with the contact plate and operation of the motor is prevented when the lid is removed.

11. The interlocking blending system of claim 10, wherein the base comprises a switch that permits operation of the motor based on the inductive coupling of the first set of coils and the second set of coils when the container is operatively positioned on top of the base.

12. The blending system of claim 10, wherein the first set of inductive coils includes a transmitter coil and a receiving coil and wherein the second set of inductive coils includes a transmitter coil and a receiving coil.

13. The blending system of claim 12, wherein the transmitter coil of the first set of inductive coils induces current in the receiving coil of the second set of inductive coils in response to power supplied to the transmitter coil of the first set of inductive coils when the container is operatively attached to the base.

14. The blending system of claim 10, wherein the base comprises a sensor that monitors change in an electrical property of the first set of coils.

15. The blending system of claim 14, wherein the base determines whether the container is attached to the base based on the monitored change in the electrical property.

16. The blending system of claim 1, wherein the sensor monitors a resonance frequency or current of the first set of coils.

* * * * *